United States Patent
Nemoto et al.

(12)

(10) Patent No.: US 6,240,216 B1
(45) Date of Patent: May 29, 2001

(54) METHOD AND APPARATUS FOR PROCESSING AN IMAGE, STORAGE MEDIUM FOR STORING AN IMAGE PROCESSING PROGRAM

(75) Inventors: Naoyuki Nemoto, Yamato; Hiroyasu Takahashi, Yokohama, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,331

(22) Filed: Aug. 5, 1998

(30) Foreign Application Priority Data

Aug. 28, 1997 (JP) .................................................. 9-233048

(51) Int. Cl.$^7$ ...................................................... H04N 1/40
(52) U.S. Cl. .......................................... 382/264; 382/283
(58) Field of Search .................................... 382/264, 283, 382/274–275, 307; 358/447, 463

(56) References Cited

U.S. PATENT DOCUMENTS 4,710,965 * 12/1987 Kobayashi ............................. 382/41
4,910,608 * 3/1990 Whiteman et al. ................... 358/433
5,289,294 * 2/1994 Fujisawa ............................... 358/461

FOREIGN PATENT DOCUMENTS 1-22664    11/1982 (JP) .

* cited by examiner

*Primary Examiner*—Thomas D. Lee
*Assistant Examiner*—Stephen Brinich
(74) *Attorney, Agent, or Firm*—Robert P. Tassinari, Jr.

(57) ABSTRACT

A mask process such as smoothing of a graphic or a character drawn into a bit pattern is performed by using only SHIFT, logical NOT, AND, OR operations of bit strings, rather than using conditional branch instructions in the form of "IF THEN ELSE" and "SWITCH" statements that lead to undesirable reduction of processing speed. This results in a substantial increase of the processing speed. Further, in order to process an image that is wider than a bus width or a register length at high speed, adjacent patterns of an original image, which are not necessarily used for a logical operation, are loaded onto left and right sides of a processing object, to form a processing unit for use in a logical operation.

12 Claims, 18 Drawing Sheets

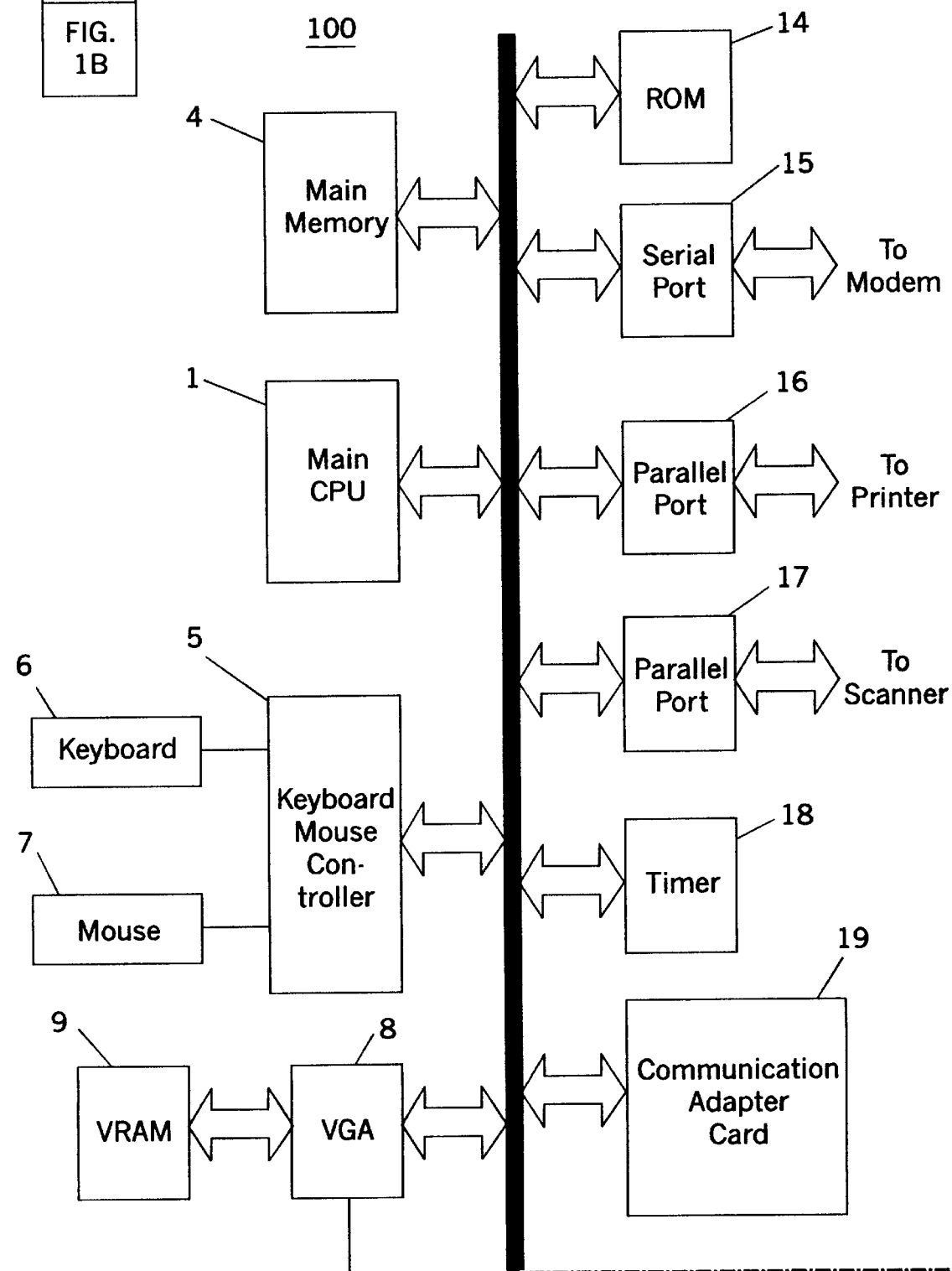

| Line | Bit Pattern | | | | | | | |
|------|---|---|---|---|---|---|---|---|
| i−1 | 0 | 0 | 0 | 0 | 0 | 0 | 0 | 0 | → upper line up = 0 0 0 0 0 0 0 0
| i | 0 | 1 | 1 | 1 | 1 | 0 | 0 | 0 | → current line ot = 0 1 1 1 1 0 0 0
| i+1 | 0 | 1 | 1 | 1 | 1 | 0 | 1 | 0 | → lower line dw = 0 1 1 1 1 0 1 0
| | 0 | 0 | 0 | 1 | 1 | 0 | 0 | 0 | a, b

| upper line shift left<br>u ℓ = up >> 1<br>0 0 0 0 0 0 0 0 | up | upper line shift right<br>u r = up << 1<br>0 0 0 0 0 0 0 0 |
|---|---|---|
| current line shift left<br>o ℓ = ot >> 1<br>0 0 1 1 1 1 0 0 | ot | current line shift right<br>o r = ot << 1<br>1 1 1 1 0 0 0 0 |
| lower line shift left<br>d ℓ = dw >> 1<br>0 0 1 1 1 1 0 1 | dw | lower line shift right<br>d r = dw << 1<br>1 1 1 1 0 1 0 0 |

| u ℓ | u p | u r |
|---|---|---|
| o ℓ | o t | o r |
| d ℓ | d w | d r | proceed from left pattern to right pattern

| NOT u ℓ | 1 1 1 1 1 1 1 1 |
| NOT u p | 1 1 1 1 1 1 1 1 |
| u r | 0 0 0 0 0 0 0 0 |
| NOT c ℓ | 1 1 0 0 0 0 1 1 |
| C r | 1 1 1 1 0 0 0 0 |
| d ℓ | 0 0 1 1 1 1 0 1 |
| dw | 0 1 1 1 1 0 1 0 |
| dr | 1 1 1 1 0 1 0 0 |
| logical OR | 1 1 1 1 1 1 1 1 |
| o t | 0 1 1 1 1 0 0 0 |
| Result | 0 1 1 1 1 0 0 0 |

} AND no change proceed from left pattern to right pattern

| | |
|---|---|
| u ℓ | 0 0 0 0 0 0 0 0 |
| u p | 0 0 0 0 0 0 0 0 |
| u r | 0 0 0 0 0 0 0 0 |
| NOT c ℓ | 1 1 0 0 0 0 1 1 |
| C r | 1 1 1 1 0 0 0 0 |
| NOT d ℓ | 1 1 0 0 0 0 1 0 |
| NOT dw | 1 0 0 0 0 1 0 1 |
| dr | 1 1 1 1 0 1 0 0 |
| logical OR | 1 1 1 1 0 1 1 1 |
| ot | 0 1 1 1 1 0 0 0 |
| Result | 0 1 1 1 0 0 0 0 |

} AND

Remove point b
(Fig. 5) by smoothing proceed from left pattern to right pattern

| | |
|---|---|
| u ℓ | 0 0 0 0 0 0 0 0 |
| NOT u p | 1 1 1 1 1 1 1 1 |
| NOT u r | 1 1 1 1 1 1 1 1 |
| c ℓ | 0 0 1 1 1 1 0 0 |
| NOT c r | 0 0 0 0 1 1 1 1 |
| d ℓ | 0 0 1 1 1 1 0 1 |
| dw | 0 1 1 1 1 0 1 0 |
| dr | 1 1 1 1 0 1 0 0 |
| logical OR | 1 1 1 1 1 1 1 1 |
| o t | 0 1 1 1 0 0 0 0 |
| Result | 0 1 1 1 0 0 0 0 |

} AND ( no change )

Remove point a
(Fig. 5) by smoothing

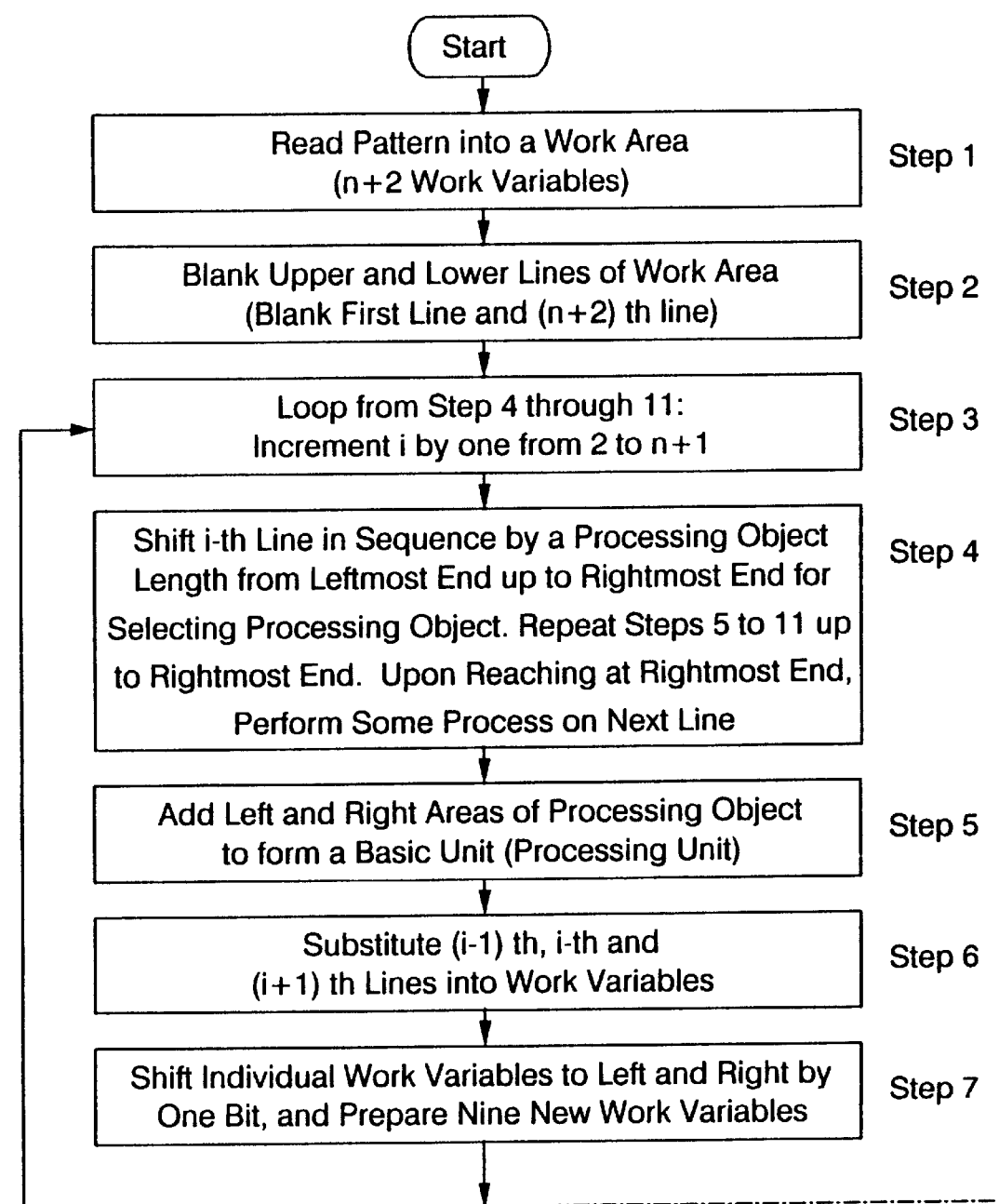

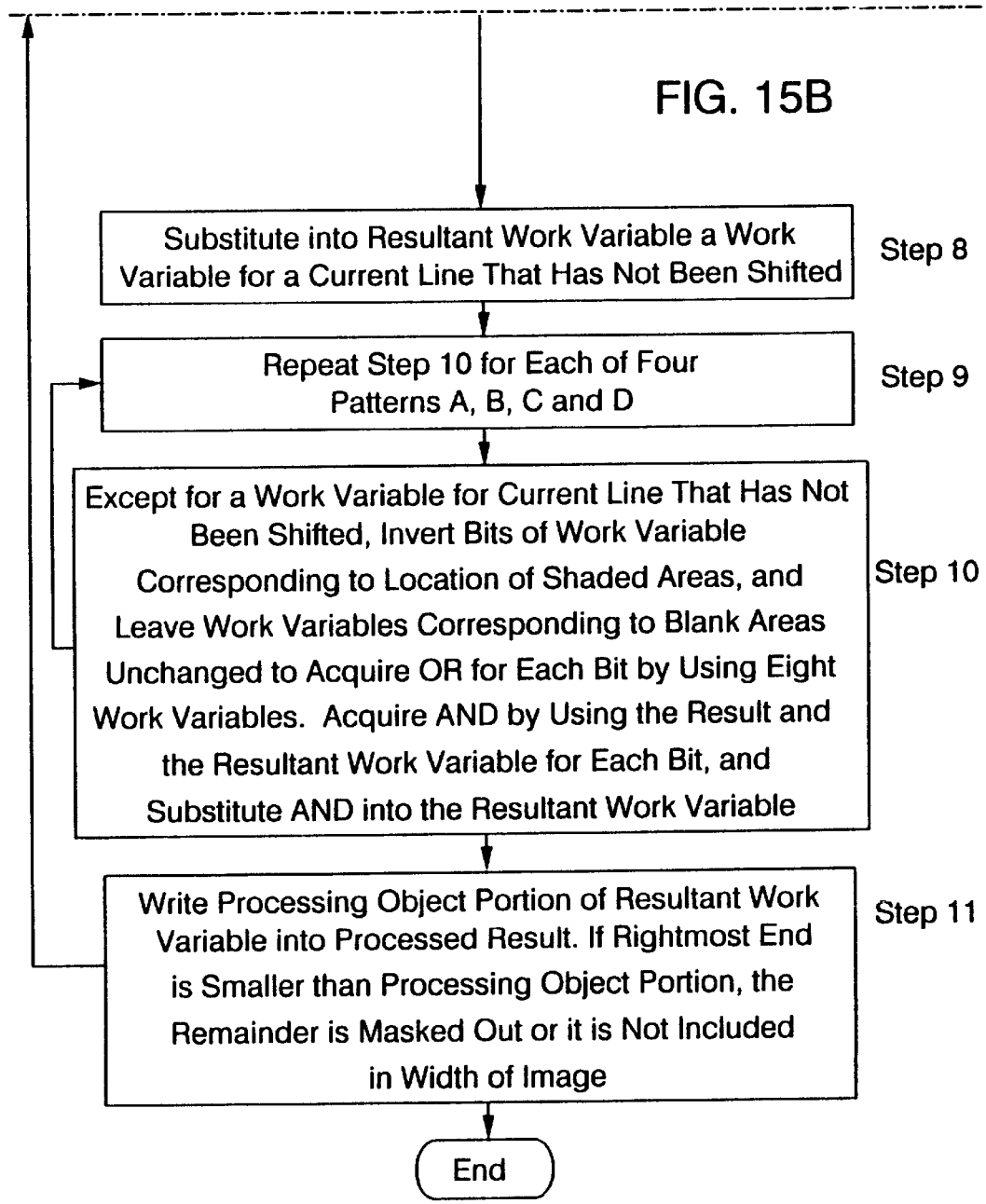

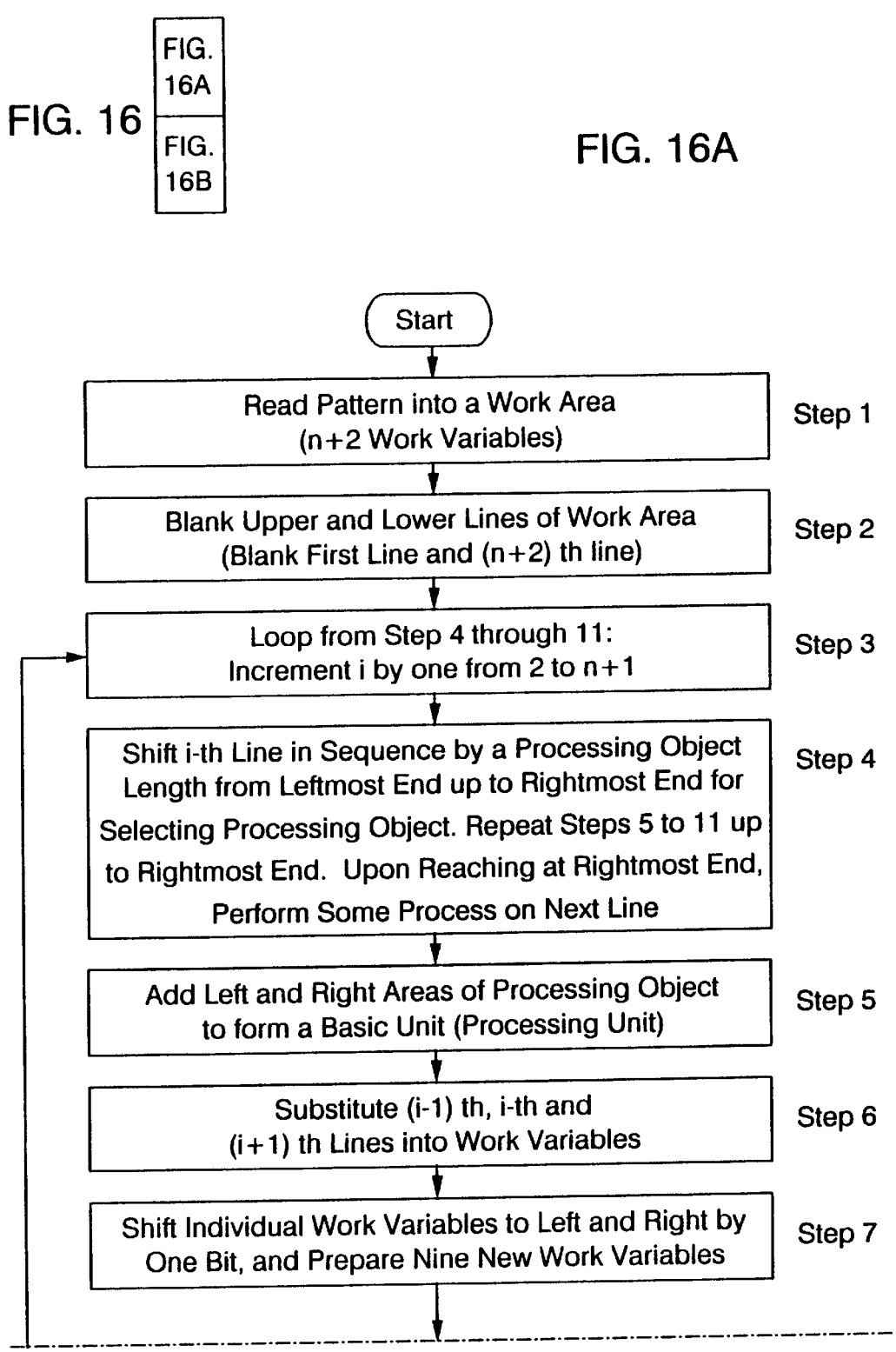

METHOD AND APPARATUS FOR PROCESSING AN IMAGE, STORAGE MEDIUM FOR STORING AN IMAGE PROCESSING PROGRAM

FIELD OF THE INVENTION

This invention relates to an image processing method and, more particularly, to mask processing (noise reduction, smoothing of a pattern or the like) of binary image data by software.

BACKGROUND OF THE INVENTION

With the wide spread use of Internet (World Wide Web) and/or the increased demands for handling of image data due to users' multimedia-oriented inclinations, it is required to process image data at high speed.

However, an image may be subject to deterioration and a noise may be generated by an image inputting phase (e.g., receipt of a scanner input, FAX data from a public telephone line, an input from a digital camera) and by an image processing phase (e.g., an analog/digital conversion, an image compression/decompression process). Also, in case of enlarging a pattern such as an inputted small character, a resultant pattern having a large corner that is not represented by a smooth curve may be generated.

Such an image including a deteriorated pattern appears ungainly to a user and it becomes sometimes unrecognizable. Also, in case of subsequently performing pattern recognition (e.g., character or graphic recognition), it causes a problem such as degradation of a recognition rate and/or increase of processing time to occur.

In order to solve the problem of prior art, another Japanese patent application (H8-42302), filed on Feb. 29, 1996, by the assignee of the present application, which is not publicly available at the filing date the present application, proposes a method of performing a smoothing process at high speed by using only SHIFT, logical NOT, AND, OR operations of bit strings, without recourse to conditional tests in the form of "IF THEN ELSE" and "SWITCH" statements that have been required in the conventional image process using a mask. However, because this prior method is limited to processing of an image with a specific horizontal size (width) such as 8/16/32/64 bits or the like due to a length of a processing unit or a register, it is now desired to provide an improved method that may be applied to an image with an arbitrary size.

It is, therefore, an object of this invention to improve a processing speed in smoothing a graphic outline.

It is another object of this invention to enable application of a high speed image process using a mask, which is adapted for noise reduction and/or smoothing of an enlarged image, to a binary image with an arbitrary size.

It is another object of this invention to provide a pattern (character or graphic) recognition system that has a high recognition rate.

BRIEF DESCRIPTION OF THE INVENTION

In case of performing a mask process such as smoothing for a graphic or a character of a binary image drawn into a bit pattern, it is contemplated to use only SHIFT, logical NOT, AND, OR operations of bit strings, rather than using conditional branch instructions in the form of "IF THEN ELSE" and "SWITCH" statements that lead to undesirable reduction of processing speed. In so doing, this method enables a substantial increase in the processing speed.

Further, in order to process an image that is wider than a bus width or a register length at high speed, adjacent patterns of an original image, which are not necessarily used for a logical operation, are loaded onto left and right sides of a processing object, such that this is used as a processing unit in an operation. Then, as a processed result, the part of the processing object is outputted.

In accordance with one aspect of this invention, there is provided a method of processing an image of a bit pattern, which is "m" bits wide and "n" lines high ("m" and "n" are natural numbers), by using a computer system having an operation storage area of an "r" bit width ("r" is a natural number), comprising the steps of:

(a) extracting from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and storing said processing unit into said operation storage area;

(b) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively:

(c) outputting "s" bits including a result of said logical operations as a processed result; and (d) repeating said steps (a) through (c) by using "s" bits that consecutively succeed said current processing object as a new current processing object.

Note here that, in the claims of the present specification, the expression "operation storage area" represents a concept covering a register.

In accordance with another aspect of this invention, there is provided a method of processing an image of a bit pattern, which is "m" bits wide and "n" lines high ("m" and "n" are natural numbers), by using a computer system having an operation storage area of an "r" bit width ("r" is a natural number), comprising the steps of:

(a) extracting from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and storing said processing unit into said operation storage area;

(b) performing logical operations by using bits included in said "a" bits and said current processing object;

(c) outputting "s" bits including a result of said logical operations as a processed result; and (d) repeating said steps (a) through (c) by using "s" bits that consecutively succeed said current processing object as a new current processing object.

In accordance with another aspect of this invention, there is provided a method of processing an image of a bit pattern, which is "m" bits wide and "n" lines high ("m" and "n" are natural numbers), by using a computer system having an operation storage area of an "r" bit width ("r" is a natural number), comprising the steps of:

(a) extracting from a current "i"th line ("i" is a natural number less than or equal to "n") of said bit pattern, a processing unit of "t" bits ("t" is a natural number less than or equal to "m" and "r") including a current processing object of "s" bits along with "a1" bits immediately preceding said current processing object and "a2" bits immediately succeeding said current processing object ("a1" and "a2" are natural numbers), and storing said processing unit into said operation storage area;

(b) performing logical operations by using bits included in said "a1" bits, said "a2" bits and said current processing object;

(c) outputting "s" bits including a result of said logical operations as a processed result; and (d) repeating said steps (a) through (c) by using "s" bits that consecutively succeed said current processing object as a new current processing object.

In accordance with another aspect of this invention, there is provided a method of processing an image of a bit pattern, which is "m" bits wide and "n" lines high ("m" and "n" are natural numbers), by using a computer system having an operation storage area of an "r" bit width ("r" is a natural number), comprising the steps of:

(a) extracting from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and storing said processing unit into said operation storage area;

(b) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(c) outputting "s" bits including a result of said logical operations as a processed result;

(d) repeating said steps (a) through (c) by using "s" bits that consecutively succeed said current processing object as a new current processing object; and (e) performing pattern recognition based on the outputted processed result.

In accordance with another aspect of this invention, there is provided an apparatus having an operation storage area of an "r" bit width ("r" is a natural number) for processing an image of a bit pattern, which is "m" bits wide and "n" lines high ("m" and "n" are natural numbers), comprising:

(a) a work area for storing an image of said bit pattern being shifted by one line;

(b) image processing means for:

(b1) extracting from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and storing said processing unit into said operation storage area;

(b2) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(b3) outputting "s" bits including a result of said logical operations as a processed result; and (b4) repeating said steps (b1) through (b3) by using "s" bits that consecutively succeed said current processing object as a new current processing object; and (c) processed result image storage means for storing said processed result.

In accordance with another aspect of this invention, there is provided an apparatus having an operation storage area of an "r" bit width ("r" is a natural number) for processing an image of a bit pattern, which is "m" bits wide and "n" lines high ("m" and "n" are natural numbers), comprising:

(a) image processing means for:

(a1) extracting from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and storing said processing unit into said operation storage area;

(a2) performing logical operations by using bits included in said "a" bits and said current processing object;

(a3) outputting "s" bits including a result of said logical operations as a processed result; and (a4) repeating said steps (a1) through (a3) by using "s" bits that consecutively succeed said current processing object as a new current processing object; and (b) processed result image storage means for storing said processed result.

In accordance with another aspect of this invention, there is provided an apparatus having an operation storage area of an "r" bit width ("r" is a natural number) for processing an image of a bit pattern, which is "m" bits wide and "n" lines high ("m" and "n" are natural numbers), comprising:

(a) a work area for storing an image of said bit pattern being shifted by one line;

(b) image processing means for:

(b1) extracting from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and storing said processing unit into said operation storage area;

(b2) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(b3) outputting "s" bits including a result of said logical operations as a processed result; and (b4) repeating said steps (b1) through (b3) by using "s" bits that consecutively succeed said current processing object as a new current processing object;

(c) processed result image storage means for storing said processed result; and (d) image recognition means for performing pattern recognition based on the outputted processed result.

In accordance with another aspect of this invention, there is provided a storage medium for storing an image processing program executable on a computer system having an operation storage area of an "r" bit width ("r" is a natural number), said image processing program being adapted for processing an image of a bit pattern, which is "m" bits wide and "n" lines high ("m" and "n" are natural numbers), said image processing program comprising:

(a) program code for indicating said computer system to extract from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and to store said processing unit into said operation storage area;

(b) program code for indicating said computer system to perform logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(c) program code for indicating said computer system to output "s" bits including a result of said logical operations as a processed result; and (d) program code for indicating said computer system to repeat said steps (a) through (c) by using "s" bits that consecutively succeed said current processing object as a new current processing object.

In accordance with another aspect of this invention, said logical operations includes a logical AND operation between said current processing object and either one of:

(a) an operation result obtained by inverting only three line variables, including said upper processing object, as well as two line variables being formed by bit-shifting each of said current and upper processing objects to the left respectively, and by performing a logical OR operation among the said inverted three line variables and the remaining non-inverted line variables other than said current processing object;

(b) an operation result obtained by inverting only three line variables, including said lower processing object, as well as two line variables being formed by bit-shifting each of said current and lower processing objects to the left respectively, and by performing a logical OR operation among the said inverted three line variables and the remaining non-inverted line variables other than said current processing object;

(c) an operation result obtained by inverting only three line variables, including said upper processing object, as well as two line variables being formed by bit-shifting each of said current and upper processing objects to the right respectively, and by performing a logical OR operation among the said inverted three line variables and the remaining non-inverted line variables other than said current processing object; and (d) an operation result obtained by inverting only three line variables, including said lower processing object, as well as two line variables being formed by bit-shifting each of said current and lower processing objects to the right respectively, and by performing a logical OR operation among the said inverted three line variables and the remaining non-inverted line variables other than said current processing object.

In accordance with another aspect of this invention, said logical operations includes a logical AND operation between said current processing object and either one of:

(e) an operation result obtained by performing a logical OR operation among five line variables, including three line variables being formed by bit-shifting each of said current, upper and lower processing objects to the right respectively, as well as said upper and lower processing objects;

(f) an operation result obtained by performing a logical OR operation among five line variables, including four line variables being formed by bit-shifting each of said current and lower processing objects to the left and right respectively, as well as said lower processing object;

(g) an operation result obtained by performing a logical OR operation among five line variables, including three line variables being formed by bit-shifting each of said current, upper and lower processing objects to the left respectively, as well as said upper and lower processing objects; and (h) an operation result obtained by performing a logical OR operation among five line variables, including four line variables being formed by bit-shifting each of said current and upper processing objects to the left and right respectively, as well as said upper processing object.

In accordance with another aspect of this invention, there is provided a storage medium for storing an image processing program executable on a computer system having an operation storage area of an "r" bit width ("r" is a natural number), said image processing program being adapted for processing an image of a bit pattern, which is "m" bits wide and "n" lines high ("m" and "n" are natural numbers), said image processing program comprising:

(a) program code for indicating said computer system to extract from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and to store said processing unit into said operation storage area;

(b) program code for indicating said computer system to perform logical operations by using bits included in said "a" bits and said current processing object;

(c) program code for indicating said computer system to output "s" bits including a result of said logical operations as a processed result; and (d) program code for indicating said computer system to repeat said steps (a) through (c) by using "s" bits that consecutively succeed said current processing object as a new current processing object.

In accordance with another aspect of this invention, there is provided a storage medium for storing an image processing program executable on a computer system having an operation storage area of an "r" bit width ("r" is a natural number), said image processing program being adapted for processing an image of a bit pattern, which is "m" bits wide and "n" lines high ("m" and "n" are natural numbers), said image processing program comprising:

(a) program code for indicating said computer system to extract from a current "i"th line ("i" is a natural number less than or equal to "n") of said bit pattern, a processing unit of "t" bits ("t" is a natural number less than or equal to "m" and "r") including a current processing object of "s" bits and a pair of "a" bits ("a" is a natural number), each immediately preceding and succeeding said current processing object respectively, and to store said processing unit into said operation storage area;

(b) program code for indicating said computer system to perform logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(c) program code for indicating said computer system to output "s" bits including a result of said logical operations as a processed result;

(d) program code for indicating said computer system to repeat said steps (a) through (c) by using "s" bits that consecutively succeed said current processing object as a new current processing object; and (e) program code for indicating said computer system to perform pattern recognition based on the outputted processed result.

BRIEF DESCRIPTION OF THE DRAWINGS

FIG. 15 is a flow chart showing a smoothing process for large corners in accordance with this invention.

FIG. 17 is a diagram showing a bit pattern before performing a smoothing process for corners in accordance with this invention.

FIG. 18 is a diagram showing a bit pattern after performing a smoothing process for corners in accordance with this invention.

DETAILED DESCRIPTION OF THE INVENTION

Figure 1B:
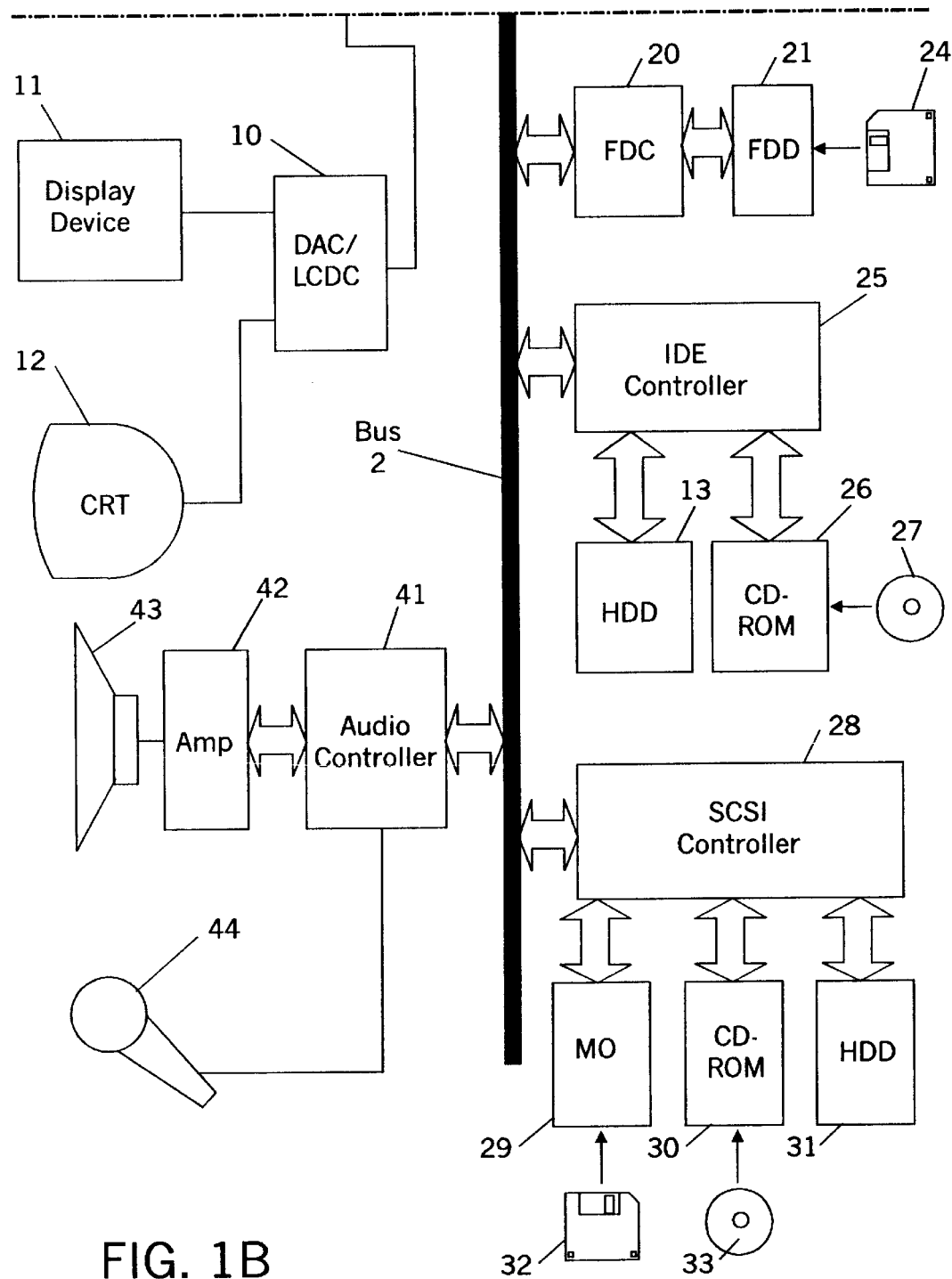
FIG. 1 is a block diagram showing a hardware configuration.

Now, with reference to the drawings, an embodiment of this invention will be described. Referring to FIG. 1, there is schematically shown a hardware configuration for implementing an image processing system 100 of this invention. The present system 100 includes a central processing unit (CPU) 1 and a memory 4. CPU 1 and memory 4 are connected to hard disk drives 13, 30 as auxiliary storage devices via a bus 2 and the like. A floppy disk drive (or another storage medium drive such as an MO drive 29, CD-ROM drives 26, 30) 21 is connected to bus 2 via a floppy disk controller (or a variety of controllers such as an IDE controller 25, a SCSI controller 28) 20.

A floppy disk (or another storage medium such as an MO disk 32, a CD-ROM 27 or 33) 24 inserted into floppy disk drive (or another storage medium drive such as MO drive 29, CD-ROM drives 26, 30) 21, hard disk drive 13 and/or a ROM 14 is capable of storing a computer program code for practicing this invention. At the time of execution, this computer program code is loaded into memory 4 such that it cooperates with an operating system to provide instructions to CPU or the like. This computer program code may be compressed or divided into a plurality of segments for storing across a plurality of media. Similarly, each of said storage media is capable of storing input image data and processed image data as well.

Also, the present system 100 may be provided with user interface hardware, including a pointing device (such as a mouse, a joystick, a track ball) 7 for inputting information of positions on a screen, a keyboard 6 for supporting key input, as well as displays 11, 12 for presenting image data to a user. Also, a speaker 43 receives audio signals from an audio controller 41 via an amplifier 42, and outputs the audio signals as sounds.

Preferably, image data to be inputted into the present system 100 is created by a scanner (not shown) and provided to the present system 100 via a parallel port 17. Alternatively, such image data created by scanner may be inputted into the present system 100 via SCSI controller 28 rather than parallel port 17 or another interface. The present system 100 may communicate with another computer or the like via a serial port 15 and a modem or a communication adapter 19 such as token ring type for receiving image data, or the present system 100 may receive an input from a storage medium such as floppy disk 24. Further, the present system 100 may be connected to a digital camera via serial port 15 or the like for receiving image data therefrom.

It will be readily understood from the foregoing that this invention may be implemented by a conventional personal computer (PC), a workstation, a dedicated OCR, a computer incorporated into a variety of household electric appliances such as a TV set or a FAX machine, and any combinations thereof. Note, however, that these elements are listed for an exemplification purpose only, and all of these elements are not necessarily equated with essential elements of this invention. In particular, since this invention is directed to smoothing of an image, those elements such as serial port 15, communication adapter 19, audio controller 41, amplifier 42 and speaker 43 are non-essential elements in one aspect of this invention.

While it is desirable to use either one of those operating systems supporting a GUI multiwindow environment such as "Windows" (trademark of Microsoft Corp), "OS/2" (trademark of IBM Corp.), "X-WINDOWS system" (trademark of MIT) on "AIX" (trademark of IBM Corp.), this invention is not limited to a particular operating system environment.

Also, while FIG. 1 shows a system in a stand-alone environment, this invention may be implemented as a client/server system in such a way that a client machine is connected to a server machine by means of a LAN such as an Ethernet or a token-ring. The client machine may be provided with a limited number of functions to be described below such as a user input means, an image display means and an image input means, whereas the server machine may be provided with the remaining functions. Various changes or modifications, including but not limited to a distribution of functions among a plurality of machines such as the server and client machines, may be freely made by those skilled in the art without departing from the spirit of this invention.

B. System Configuration

Next, with reference to a block diagram of FIG. 2, a system configuration of this invention will be described. In a preferred embodiment of this invention, the present image processing system 100 comprises a user input means 101, a control means 103, an image processing means 105, a processed image storage means 107, an image recognition means 109, an image display means 111, an image input means 113 and a work area 113.

User input means 101 has a function for receiving those inputs from a user, including instructions for starting/ending of processing, setting of an input image, setting of a mask pattern (designation of deleting large corners or protruding/extraneous dots) or the like, and for transmitting them to control means 103. Image input means 113 contains image information such as a document image inputted from a scanner or the like, and then transmits such image information to control means 103. Image processing means 105 uses a work area 115, smooths the image information contained in image input means 113, and then returns it to control means 103.

Control means 103 receives the processed image data from image processing means 105, and then stores it into processed image storage means 107. Image display means 111 displays, on a display screen 12, the image data contained in image input means 113 and processed image storage means 107, image recognition means 109 extracts a feature from the image data contained in processed image storage means 107, performs a pattern matching operation, and then outputs a recognition result. Since this image recognition means 109, corresponding to a known character or graphic recognition engine, is well known to a person skilled in the art, its detailed explanation is not given herein.

Note that in case of character recognition, image processing means 105 may be provided with functions for deciding position/size/character class of each individual character and converting the character to a standard size based on this decision result, in addition to a normalizing function for correcting direction/position of the character. Also, prior to outputting a recognition result, it is possible to perform an automatic error correction using a word dictionary. Further, in case of graphic recognition, it is possible to perform a conversion from a color image to a monochrome white/black gradation image by means of a grayscale or dithering conversion.

Figure 2:
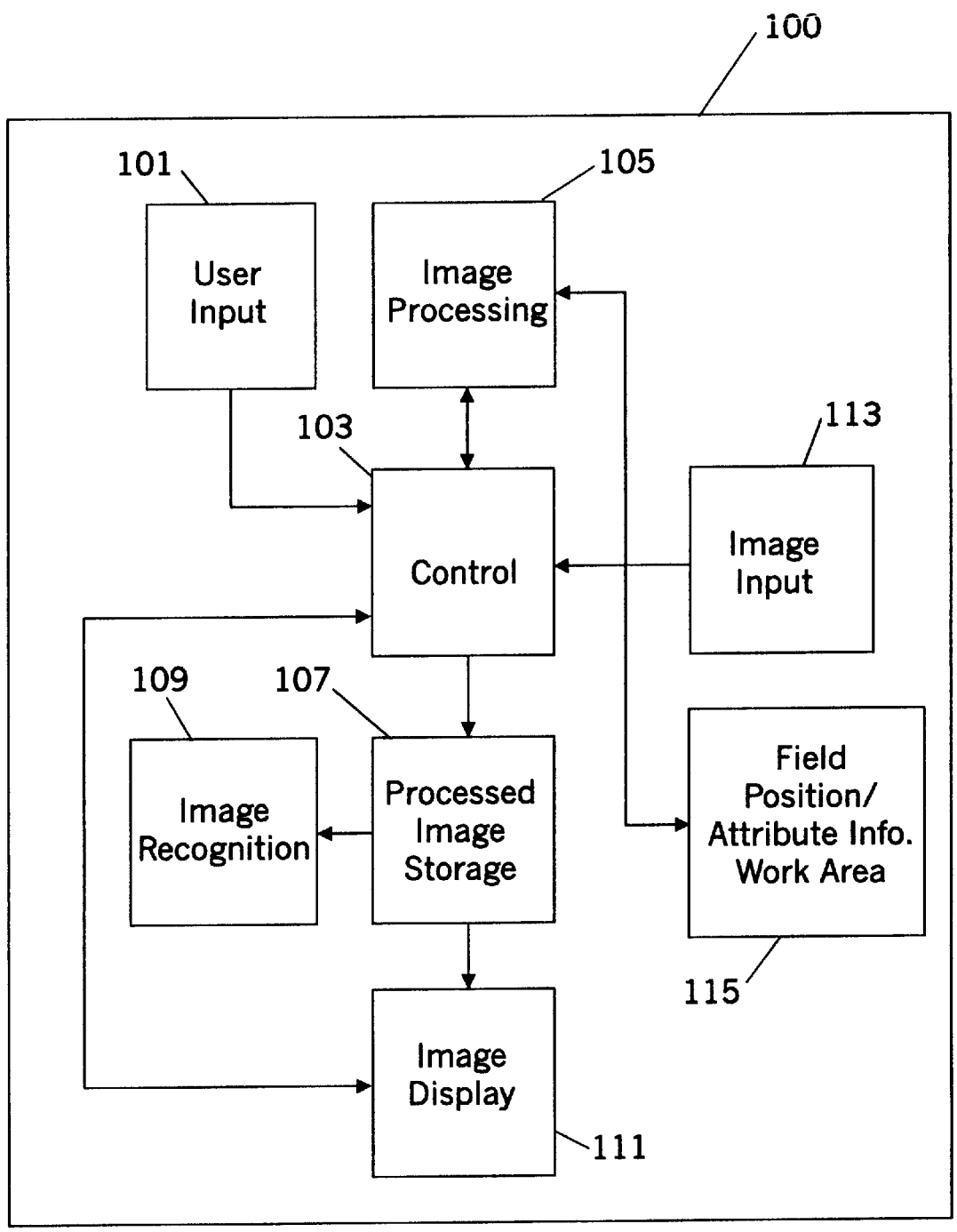
FIG. 2 is a block diagram showing elements of an image processing system.

While each functional block shown in FIG. 2 has been described above, it is noted that these blocks are logical functional blocks. Thus, each of them is not necessarily implemented by bulky hardware/software components, but it may be implemented by combined or common hardware/software components. Further, it should be noted that all of the elements shown herein are not necessarily equated with essential elements of this invention. For example, since a processed result image that is a resultant output of the inventive process is obtained from control means 103, other means such as processed result image storage means 107, image recognition means 109 and image display means 111 are non-essential elements in one aspect of this invention.

Next, prior to describing detailed processing procedures in a preferred embodiment of this invention, the image processing method of said Japanese patent application H8-42302 will be described below.

This prior application discloses the following two methods adapted for high speed smoothing:

(1) Smoothing of Large corners (deleting corners); and (2) Smoothing by Deletion of Individual Protruding/Extraneous Dots.

While this prior application describes a smoothing method for a graphic drawn into a bit pattern of 8 bits wide and n lines high, this method may be applied to those of 16/32/64 bits wide in a similar manner. Further, by setting a different mask pattern, this method may be flexibly changed so as to process a different pattern on a bit basis.

(1) Smoothing of Large Corners

Figure 3:
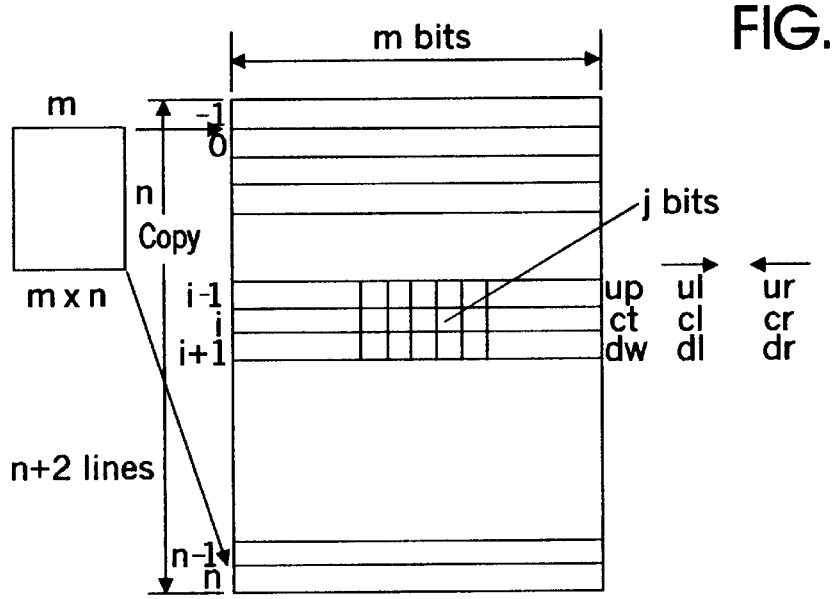
FIG. 3 is a conceptual diagram showing image data in a bitmap form.

Corner smoothing (deletion of corners) is performed by deleting one dot of a corner whenever a pattern of 3 bits wide and 3 bits high, which is extracted from image data shown in FIG. 3, matches either one of the following 4 mask patterns (A, B, C and D). For this process, it is important that a dot at a corner is automatically deleted at high speed by solely using logical operations, rather than performing the conventionally used pattern matching combined with conditional branches.

TABLE 1

| A | | | B | | | | | |
|---|---|---|---|---|---|---|---|---|
| * | * | . | * | * | . | . | . | . |
| . | . | . | . | . | . | . | . | . |
| * | * | . ⇒ | * | . | . | * | * | . ⇒ * |
| . | . | . | . | . | . | * | * | . * |
| * | . | . | . | . | . | . | . | . |
| C | | | D | | | | | |
| . | * | * | . | * | * | . | . | . |
| . | * | * | ⇒ . | . | * | . | * | * ⇒ . |
| . | * | . | . | . | . | * | * | . |
| . | . | . | . | . | . | * | * | . |
| * | * | . | . | . | . | . | . | . |

"*" is a black point (= 1)
"." is a blank (= 0)

Figure 4:
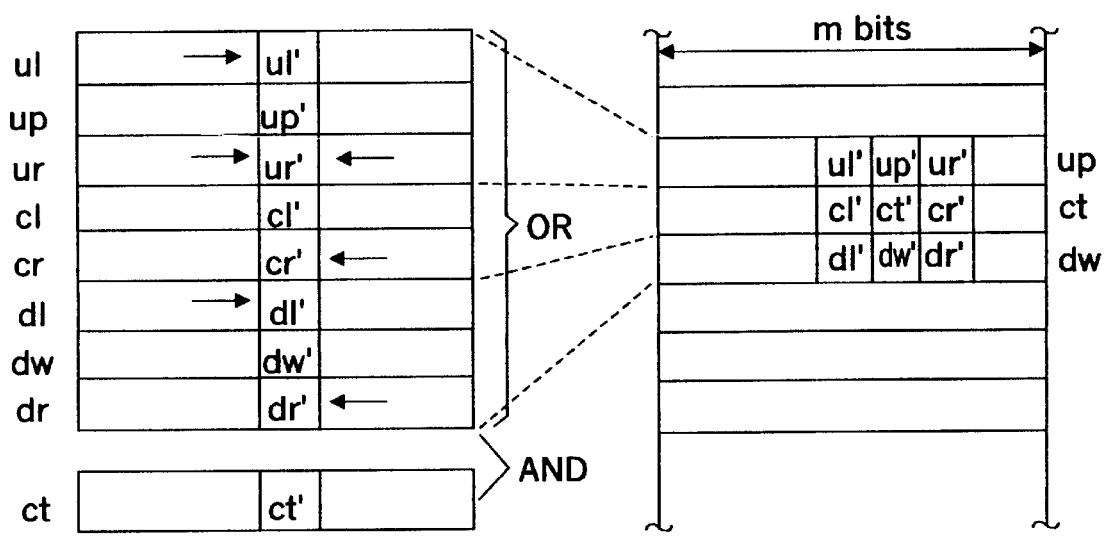
FIG. 4 is a diagram showing a correspondence between a bit pattern represented by binary values and a current line.

By way of example, the smoothing processing for a pattern of 8 bits wide is explained below. In FIG. 4, there is shown a bit pattern (a normalized pattern) represented by binary values (1 or 0). Note here that a "0" corresponds with absence of a dot in a graphic or a character drawn into the bit pattern, whereas a "1" corresponds with presence of a dot in such a graphic or a character. The processing is performed on a horizontal line basis (one line=one processing unit=8 bits). A line that serves as the center for current processing is called a current line, and is represented by a symbol "ct", while a line immediately above it is represented by "up" and a line immediately below it is represented by "dw". Also, positions labeled "a" and "b" represent those dots to be deleted as the result of the subsequent smoothing process.

Figures 5, 6:
FIG. 5 is a diagram showing lines obtained by shifting a current line and its previous and next lines.
FIG. 6 is a diagram illustrating a smoothing method.

Further, as shown in FIG. 5, bit strings derived from these 3 lines are separately defined. That is, bit strings "ul", "ur", "cl", "cr", "dl" and "dr". Letters "l" and "r", suffixes for these line names, stand for "left" and "right" respectively. By way of example, "cl" means that the current line is shifted to the left by one bit position. Note here that "shift to the left" is defined as a shift in the direction seen from the side of a viewpoint, i.e., from the side of a sensor. Therefore, the bit strings in a memory are shifted in the opposite direction, i.e., to the right by one bit position. These 9 bit strings are stored into a work area in a memory and they are subject to subsequent operations.

Figure 7:
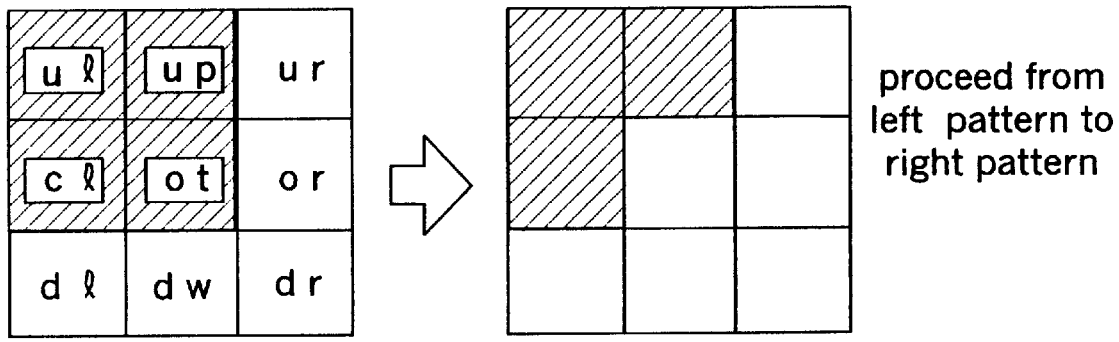
FIG. 7 is a diagram showing a smoothing method for pattern A.

FIGS. 6 through 10 are diagrams showing the actual smoothing methods for said patterns (A, B, C and D). In FIG. 7, there is shown the smoothing process for pattern A. The involved 9 blocks are located at the same positions as those for the work variables after the shift scanning in FIG. 5 is performed. That is, shifting the current line as well as the lines above and below it, to the left and the right by one bit position respectively to derive additional lines, and then logically positioning these derived lines around the dots in question, the smoothing process to be performed solely by subsequent logical operations may be easily understood.

Since the pattern A is a case where 4 bits at the left upper corner are black points (presence of dots), bit strings in "ul", "up" and "cl" other than the current line that correspond to the black points are inverted (in correspondence with the black points). Other bit strings, "ur", "cr", "dl", "dw" and "dr" that correspond to the blanks, are maintained unchanged (in correspondence with the blanks). Then, these 8 work variables are logically ORed. By this logical OR operation, a bit position in the current line that corresponds to a large corner is calculated as a "0". This is because if, after shifting the lines above and below to the left and the right by one bit position and inverting, these lines in correspondence with the black points, the logical OR of all the resultant bits is "0", this has the same value as a corner.

When the result obtained by this logical OR operation and the bit string of the current line are logically ANDed (by using it as a bit mask for the current line), the smoothing process for the current line is terminated. Since in the example in FIG. 7, this logical OR operation results in all "1s", it is understood that there is no corner to be smoothed. When this process is performed for all of the lines, the entire smoothing for pattern A is terminated.

Figure 8:
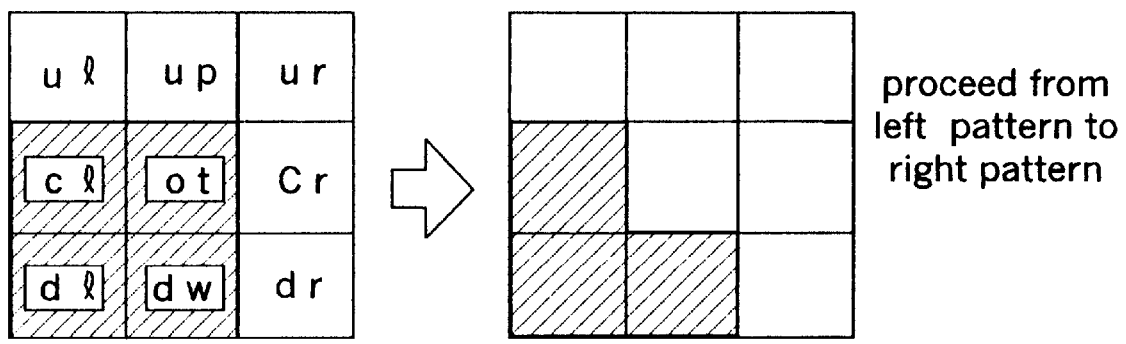
FIG. 8 is a diagram showing a smoothing method for pattern B.
Figure 9:
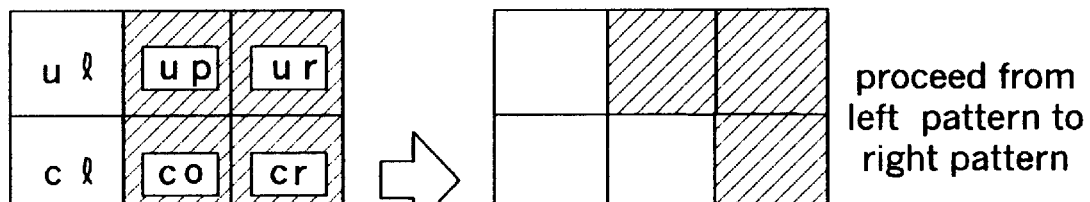
FIG. 9 is a diagram showing a smoothing method for pattern C.
Figure 10:
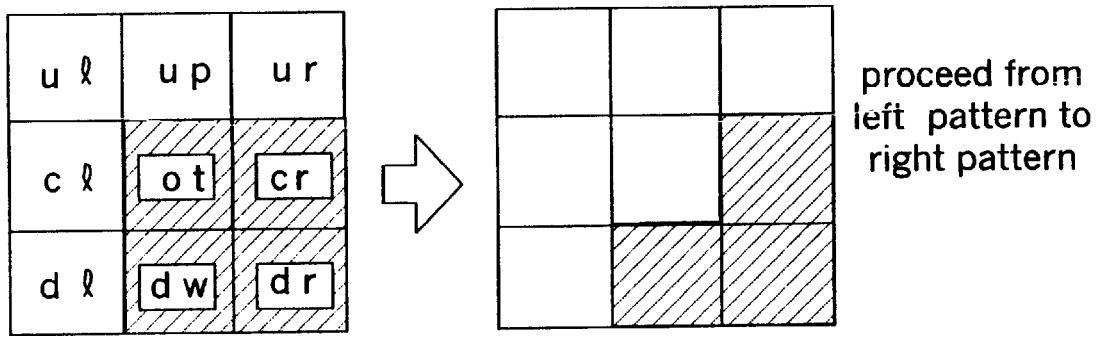
FIG. 10 is a diagram showing a smoothing method for pattern D.

In FIG. 8, there is shown a case where 4 bits at the lower left corner are black points. The same calculations as those described with reference to FIG. 7 are performed. As a result of the logical OR operation, the fifth bit becomes "0", which indicates that the fifth bit in the current line corresponds to a corner. The fifth bit, i.e., point "b" in FIG. 5, will be deleted accordingly. In FIGS. 9 and 10, the processing for patterns C and D are performed in the same manner as above. In the case of FIG. 10, as a result of the logical OR operation, the second bit turns to be "0", indicating that point "a" in FIG. 5 is to be deleted by the smoothing process.

Figure 11:
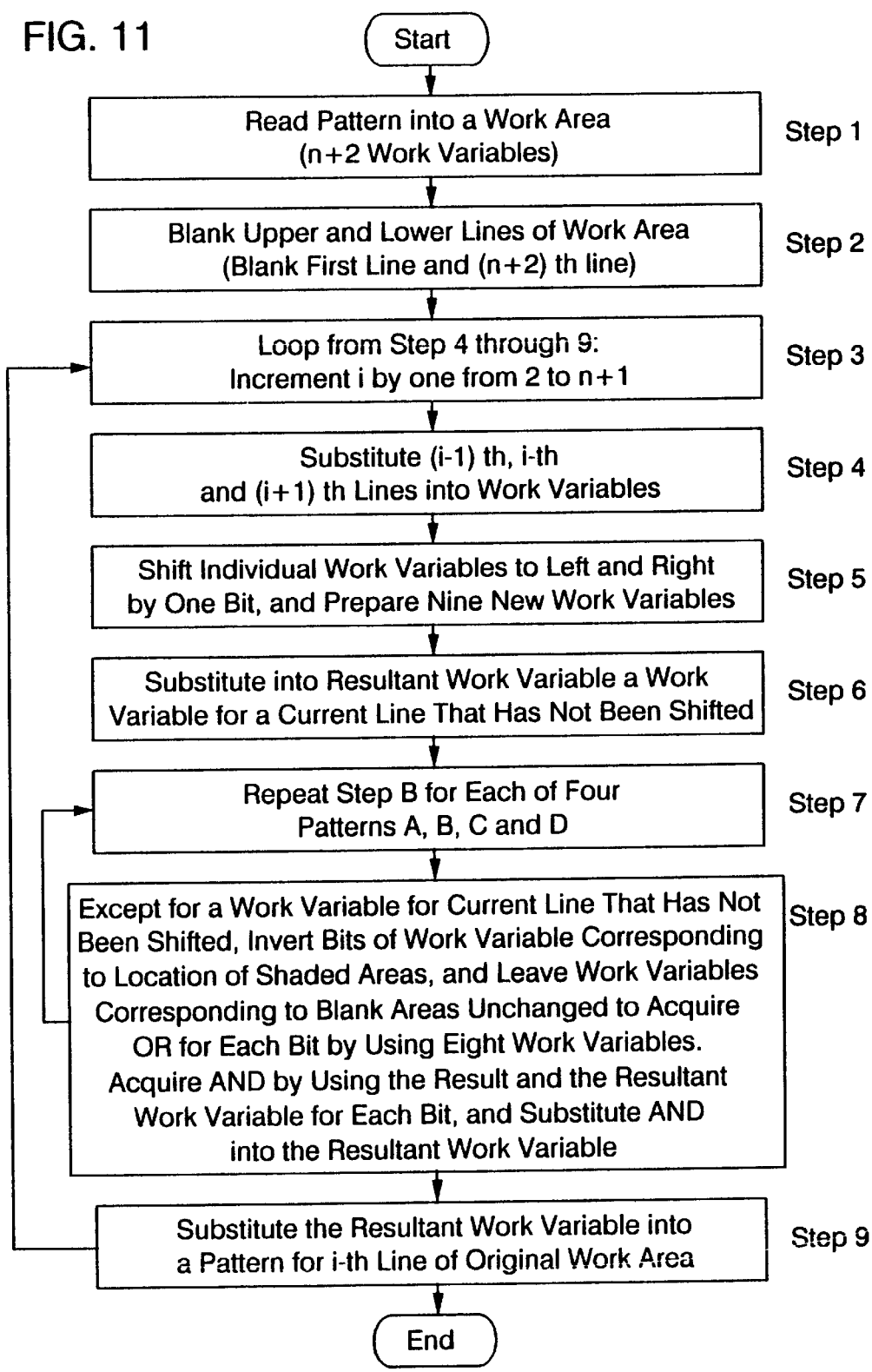
FIG. 11 is a flowchart showing a smoothing process for corners.

FIG. 11 shows a flowchart of the process for smoothing large corners. At step 1, a bit pattern is read into a work area (line variables or work variables). When the total number of lines in the bit pattern is defined to be "n", the work area contains "n+2" lines, since it has an extra line at the top and at the bottom respectively. Therefore, the bit pattern is read and stored into the work area from its second line. At step 2, said 2 lines at the top and the bottom in the work area are blanked out. At step 3, a loop variable "i" is incremented by one from "2" to "n+1" for causing the subsequent step 4 through step 9 to be repeated.

At step 4, with respect to the "i"th line of the work area, its preceding line (i−1), the current line (i) and its next line (i+1) are substituted into the work variables. At step 5, the work variables are shifted to the right and to the left by one bit position respectively and are substituted into different work variables. Therefore, 9 work variables are created. At step 6, work variable for the current line that is not shifted is substituted into a resultant work variable.

At step 7, the subsequent step 8 is repeated for each of the patterns (A, B, C and D). At step 8, except for the work variable: of the current line that is not shifted, the work variables that correspond to the positions of blanks are maintained unchanged, whereas bits of the work variables that correspond to the positions of black points are inverted. These 8 work variables so obtained are employed to acquire the total logical OR result for each bit. Then, an AND operation is performed for each bit of the logical OR result and the resultant work variable, and the results are substituted into the resultant work variable.

Finally, at step 9, the resultant work variable is substituted into the pattern of the "i"th line in the work area. Thus, the process for smoothing corners is now completed.

A specific example that is written in C in accordance with the flowchart in FIG. 11 is exemplified below for a reference purpose.

```
void Smooth24 (
  unsigned short *buf16x24 /* pointer to a pattern to be
  smoothed */) {
    static unsigned short wkbuf[26]; /* work area */
    short        i;
    unsigned short ct;   /* center     work variable 1 */
    unsigned short cl;   /* c. left    work variable 2 */
```

-continued

```
unsigned short cr;   /* c. right      work variable 3 */
unsigned short up;   /* up            work variable 4 */
unsigned short ul;   /* u. left       work variable 5 */
unsigned short ur;   /* u. right      work variable 6 */
unsigned short dw;   /* down          work variable 7 */
unsigned short dl;   /* d. left       work variable 8 */
unsigned short dr;   /* d. right      work variable 9 */
unsigned short wk3;  /* resultant     work variable    */
/* 1.   Shift a pattern of m bit wide n lines high */
/*      by one line and copy it into the work area  */
/*      (m (n+2) lines).                            */
    for (i = 1; i < 25; i ++) {
        wkbuf[i] = *(buf16x24 + i–1);
    }
/* 2.   Blank out the top and bottom lines of the */
/*      pattern in the work are                   */
    wkbuf[0] = 0;
    wkbuf[25] = 0;
/* 3.   Loop through steps 4–9 from second line */
/*      to the "n+1"th line                     */
    for (i = 1; i < 25; i ++) {
        /* 4.   Substitute (i–1)th, (i)th, and (i+1)th */
        /*      lines in the work area into work       */
        /*      variables.                             */
        ct = wkbuf[i];
        up = wkbuf[i–1];
        dw = wkbuf[i+1];
/* 5.   Shift these work variables to the left and right  */
/*      by one bit and substitute them into different    */
/*      work variables. Create 9 work variables.         */
        cl = ct >> 1;
        cr = ct << 1;
        ul = up >> 1;
        ur = up << 1;
        dl = dw >> 1;
        dr = dw << 1;
/* 6.   Substitute the work variable for the current line */
/*      not shifted into the resultant work variable.    */
        wk3 = ct;
/* 7.   Repeat step 8 for each of the 4 patterns. */
/* 8.   Except for the work variable of the current line */
/*      not shifted, leave the work variables            */
/*      corresponding to the positions of blank dots in  */
/*      the above diagram unchanged, invert bits of the  */
/*      work variables corresponding to black points.    */
/*      Use the 8 work variables to acquire an OR result */
/*      for each bit. Then, perform an AND operation for */
/*      each bit of this result and the resultant work   */
/*      variable, and substitute the AND results into the*/
/*      resultant work variable.                         */
        wk3 &=(¯ul | ¯up | ur | ¯cl |  cr | dl |  dw |  dr );
        wk3 &=( ul | ¯up | ¯ur | cl | ¯cr | dl |  dw |  dr );
        wk3 &=( ul |  up |  ur | ¯cl | cr | ¯dl | ¯dw |  dr );
        wk3 &=( ul |  up |  ur |  cl | ¯cr | dl | ¯dw | ¯dr );
/* 9.   Substitute the resultant work variable into an */
/*      original work area pattern. */
        *(buf16x24 + i–1) = wk3;
    }
} /* End of Smooth24( ) */
```

(2) Smoothing by Deletion of Individual Protruding/Extraneous Dots

This type of smoothing is performed by deleting one dot in the center, whenever a pattern of 3 bits wide and 2 bits high or 2 bits wide and 3 bits high matches either one of the following 4 patterns (E, F, G and H).

TABLE 2

| E | | F | | G | | H | |
|---|---|---|---|---|---|---|---|
| . . | | . . . | | . . | | . . . |
| * . ⇒ . . | | . * . ⇒ . . . | | . * . ⇒ . . | | . . * . ⇒ . . . |
| . . | | . . . | | . . | | . . . |

"*" is a black point (= 1)
"." is a blank (= 0)

Figure 12:
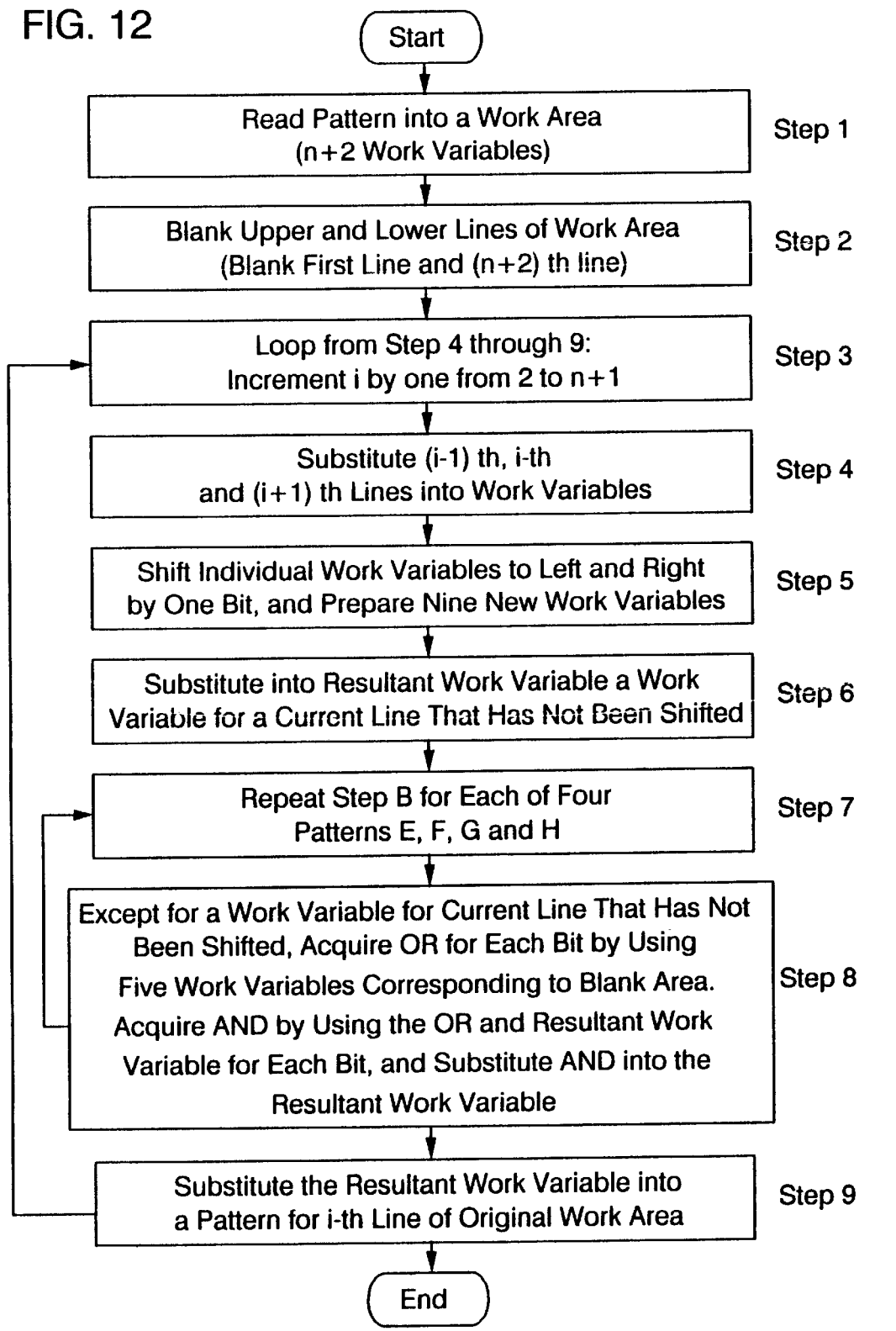
FIG. 12 is a flowchart showing a smoothing process performed by deleting individual protruding/extraneous dots.

The basic processing flow of this smoothing process is identical to that of the aforesaid smoothing process for corners. FIG. 12 shows a flowchart of this smoothing process for deleting individual protruding/extraneous dots. At step 1, a bit pattern is read into a work area. When the total number of lines in the bit pattern is defined to be "n", the work area contains "n+2" lines, since it has two extra lines at the top and at the bottom. Therefore, the bit pattern is read and stored into the work area from its second line. At step 2, the lines at the top and the bottom are blanked out. At step 3, a loop variable "i" is incremented by one from "2" to "n+1" for causing the subsequent step 4 through step 9 to be repeated.

At step 4 with respect to the "i"th line of the work area, its preceding line (i–1), the current line (i) and its next line (i+1) are substituted into the work variables. At step 5, the work variables are shifted to the right and to the left by one bit position respectively and are substituted into different work variables. Therefore, 9 work variables are created. At step 6, work variable for the current line that is not shifted is substituted into a resultant work variable. The subsequent steps 7 and 8 are slightly different from those in the smoothing process for corners.

At step 7, the subsequent step 8 is repeated for each of the patterns (E, F, G and H). At step 8, except for the work variable of the current line that is not shifted, 5 work variables that correspond to the positions of blanks are employed to acquire a total logical OR result for each bit. Then, a logical AND operation is performed for each bit of the Ored result and the resultant work variable, and the results are substituted into the resultant work variable.

Finally, at step 9, the resultant work variable is substituted into the pattern of the "i"th line in the work area. Thus, the process for smoothing by deletion of individual protruding/extraneous dots is now completed.

A specific example that is written in C in accordance with the flowchart in FIG. 12 is exemplified below for a reference purpose. Although, in an embodiment of this prior invention, a line of 8 bits wide is employed as a processing unit, this prior invention may be expanded to handle 16/32/64 bits in substantially the same manner as above. Further, since different smoothing processes may be selectively used by merely varying the black point portions and blank portions in a mask pattern set, the method of this prior invention is very flexible. Thus, this method may be applied to other image enhancement by changing the pattern.

```
void Delete24(
    unsigned short *buf16x24 /* pointer to a pattern to be
                                smoothed */) {
    static unsigned short wkbuf[26]; /* work area */
    short            i;
    unsigned short ct;     /* center      work variable 1 */
    unsigned short cl;     /* c. left     work variable 2 */
    unsigned short cr;     /* c. right    work variable 3 */
    unsigned short up;     /* up          work variable 4 */
```

```
unsigned short ul;      /* u. left      work variable 5 */
unsigned short ur;      /* u. right     work variable 6 */
unsigned short dw;      /* down         work variable 7 */
unsigned short dl;      /* d. left      work variable 8 */
unsigned short dr;      /* d. right     work variable 9 */
unsigned short wk3;     /* resultant    work variable   */
*/ 1.   Shift a pattern of m bit wide n lines high */
*/      by one line and copy it into the work area   */
*/      (m (n+2) lines).                             */
for (i = 1; i < 25; i ++) {
    wkbuf[i] = *(buf16x24 + i–1);
}
/* 2.   Blank out the top and bottom lines */
/*      of the pattern in the work area.   */
wkbuf[0] = 0;
wkbuf[25] = 0;
/* 3.   Loop through steps 4–9 from second line */
/*      to the "n+1"th line                    */
for (i = 1; i < 25; i ++) {
    /* 4.   Substitute (i–1)th, (i)th, and (i+1)th lines   */
    /*      in the work area into work variables.          */
    ct = wkbuf[i];
    up = wkbuf[i–1];
    dw = wkbuf[i+1];
    /* 5.  Shift the work variables to the left and right by   */
    /*     one bit and substitute them into different work     */
    /*     variables. Create 9 work variables.                 */
    cl = ct >> 1;
    cr = ct << 1;
    ul = up >> 1;
    ur = up << 1;
    dl = dw >> 1;
    dr = dw << 1;
    /* 6.  Substitute the work variable for the current line   */
    /*     not shifted into the resultant work variable.       */
    wk3 = ct;
    /* 7.  Repeat step 8 for each of the 4 patterns. */
    /* 8.  Except for the work variable of the current line    */
    /*     not shifted, use 5 work variables that correspond   */
    /*     to the positions of blank dots to acquire an OR     */
    /*     result for each bit. Then, perform an AND           */
    /*     operation for each bit of these results and the     */
    /*     resultant work variable, and substitute the AND     */
    /*     results into the resultant work variable.           */
    wk3 & = ( cl | cr | ul | up | ur );
    wk3 & = ( cl | cr | dl | dw | dr );
    wk3 & = ( up | dw | ul | cl | dl );
    wk3 & = ( up | dw | ur | cr | dr );
    /* 9.  Substitute the resultant work variable into an    */
    /*     original pattern of m n (m bits n lines).         */
    *(buf16x24 + i–1) = wk3;
}
}       /* End of DeleteNoise( ) */
```

Figure 13:
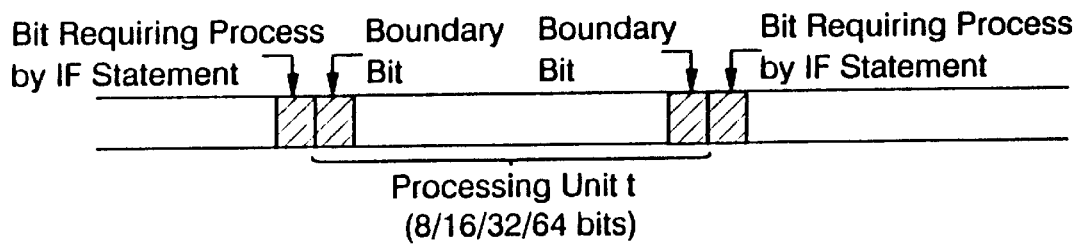
FIG. 13 is a diagram showing a processing unit adapted for use in a smoothing process in accordance with a preferred embodiment of this invention.

Notwithstanding the above described Japanese patent application (H8-42302), should an image exceed its limit (a length of processing unit/register), it must be actually processed using a register in CPU. However, if such an image is simply loaded into a register for each 64 bit group to apply the method of this prior invention, there will be no way to perform a mask process due to absence of adjacent bit for respective bits at both ends. Hence, as shown in FIG. 13, special bit processing including an IF statement must be performed. This is because a boundary bit "a" of a processing unit must be processed in accordance with its neighboring pattern.

Figure 14:
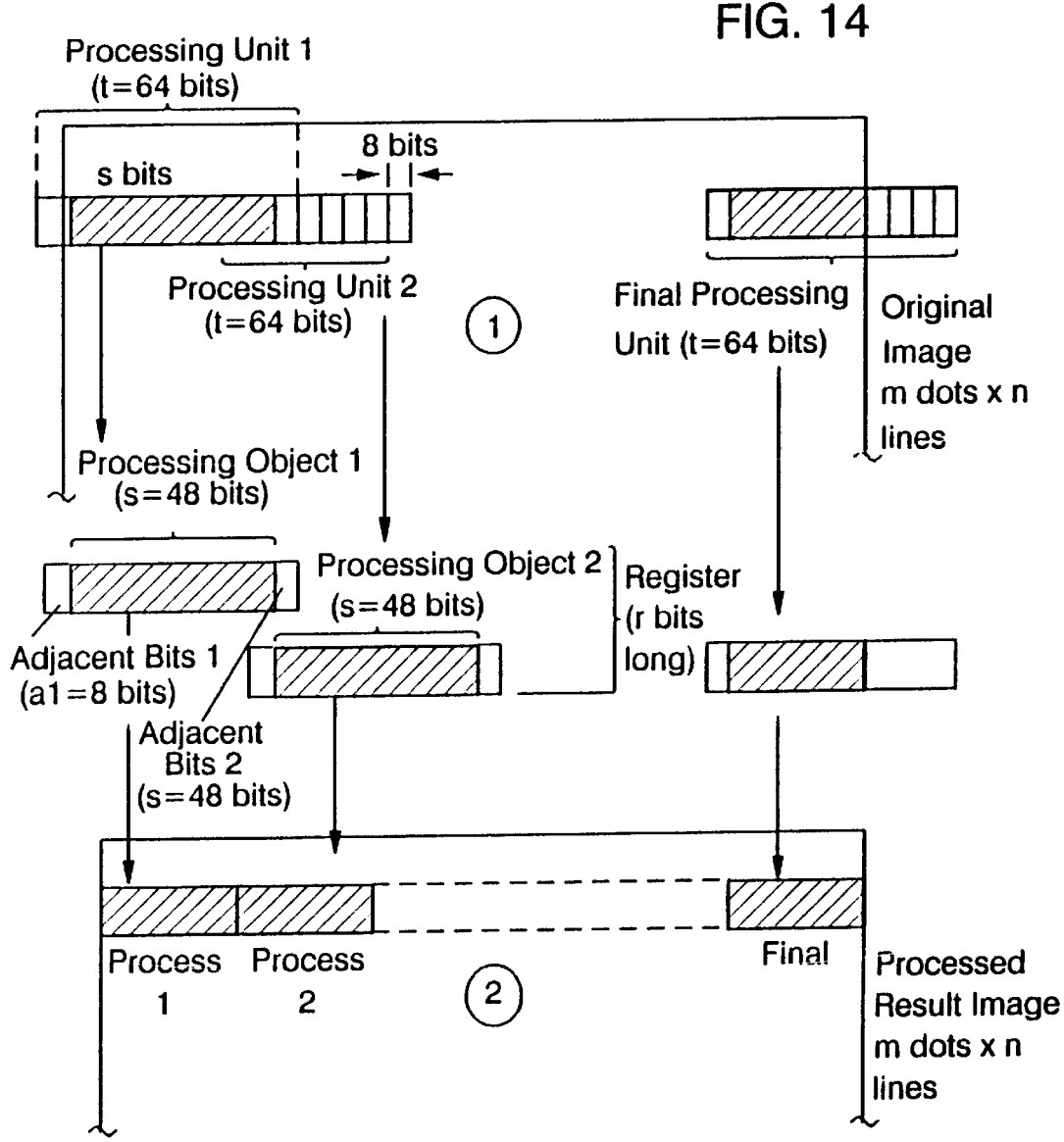
FIG. 14 is a conceptual diagram illustrating a smoothing process in accordance with a preferred embodiment of this invention.

Thus, as shown in FIG. 14, a processing unit ("t" bits) is duplicated, a pattern (a processing object having "s" bits in length) for writing a processed result therein is loaded into a center portion of an "r" bit register, and adjacent patterns (adjacent "a1"/"a2" bits) of an original image are loaded into the left and right ends of the processing object. Note that, in FIG. 14, the processing unit "t" is selected to be 64 bits, whereas the processing object to be processed and written therein is selected to be 48 bits.

In a preferred embodiment of this invention, 48 bits (hatching portion) from the leftmost end are selected as the processing object "s", as shown in FIG. 14. By adding 8 bits (adjacent "a" bits) to the left and right ends, the processing unit "t" is formed. In an exceptional case where there is no adjacent pattern "a", 8 or more "0s" will be padded.

Note here that the processing unit "t" is a unit to be concurrently operated on within the limits of the register length "r", a bus width and the like. In a preferred embodiment of this invention, the processing unit "t" is set equal to the register length "r". Also, the processing object "s" is a bit string portion that is used in an operation and reflected in a processed result.

The processing unit "t" is used in the aforesaid image processing method for deleting large corners or individual protruding/extraneous dots. The processing object "s" of 48 bits is written into a processed result image. Repeating this process and upon reaching at the rightmost end, this process returns to the leftmost end and the same processing is performed. This process is repeated in a vertical (y-axis) direction as well. Further, when the rightmost end is not 48 bits long, "0s" are padded into the remaining right-hand portion (longer than or equal to 9 bits) of the register in preparation for adequate processing.

Figure 16B:
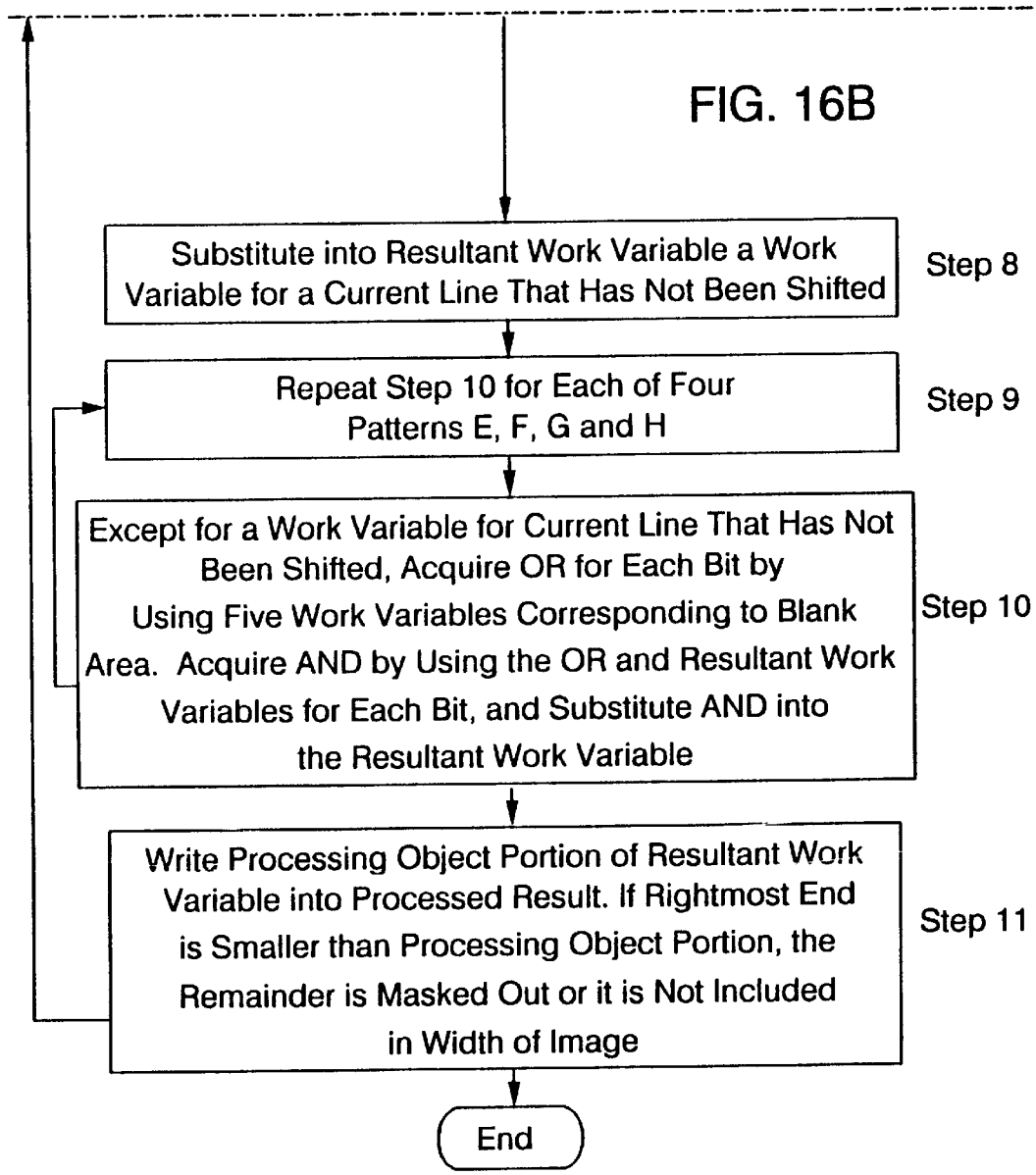
FIG. 16 is a flow chart showing a smoothing process performed by deleting individual protruding/extraneous dots in accordance with this invention.
Figure 19:
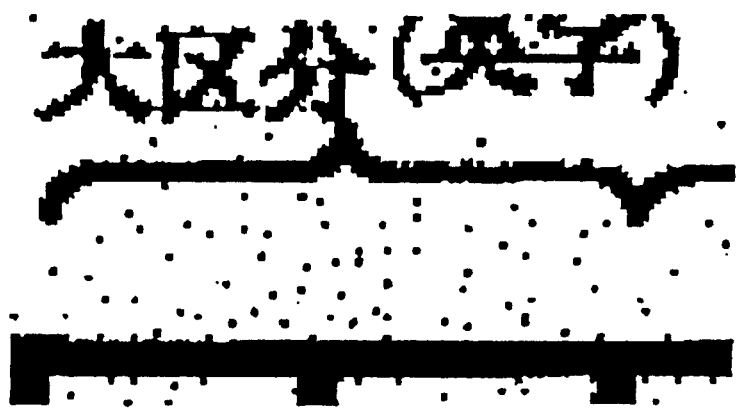
FIG. 19 is a diagram showing a bit pattern before performing a smoothing process by deleting individual protruding/extraneous dots in accordance with this invention.
Figure 20:
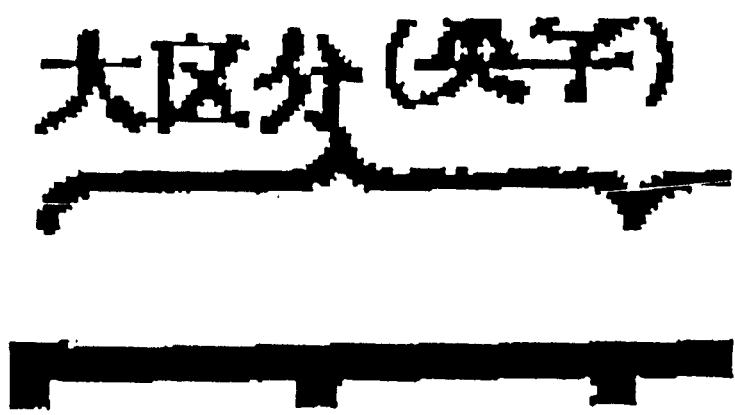
FIG. 20 is a diagram showing a bit pattern after performing a smoothing process by deleting individual protruding/extraneous dots in accordance with this invention.

FIGS. 15 and 16 show flowcharts of the processes for smoothing corners (deletion of corners) and for smoothing by deleting individual protruding/extraneous dots respectively. Algorithms used in a preferred embodiment of this invention are basically similar to those of said Japanese patent application H8-42302. Note, however, that the concept of this invention is not limited to mask processing of a 3 3 pattern, but it may be applied to mask processing of patterns larger than or equal to 1 3.

In FIG. 15, there is shown a flow chart of the process for smoothing large corners. At step 1, a bit pattern is read into a work area (line variables or work variables). When the total number of lines in the bit pattern is defined to be "n", the work area contains "n+2" lines, since it has an extra line at the top and at the bottom respectively. Therefore, the bit pattern is read and stored into the work area from its second line. At step 2, said 2 lines at the top and the bottom in the work area are blanked out. At step 3, a loop variable "i" is incremented by one from "2" to "n+1" for causing the subsequent step 4 through step 11 to be repeated.

At step 4, a bit string in the "i"th line is sequentially shifted by a processing object length from the leftmost end up to the rightmost end for selecting a processing object, and the subsequent step 5 through 11 are repeated up to the rightmost end. Upon reaching at the rightmost end, this process returns to the leftmost end of the next line and the same processing is performed again. In the example shown in FIG. 14, the processing object is set to be 48 bits long. At step 5, left and right areas of the processing object are added to form a basic processing unit (processing unit). In the example shown in FIG. 14, left 8 bits and right 8 bits are added to the processing object of 48 bit length to form the processing unit of 64 bits long.

At step 6, with respect to the "i"th line of the work area, its preceding line (i–1), the current line (i) and its next line (i+1) are substituted into the work variables. At step 7, the work variables are shifted to the right and to the left by one bit position respectively and are substituted into different work variables. Therefore, 9 work variables are created. At step 8, work variable for the current line that is not shifted is substituted into a resultant work variable.

At step 9, the subsequent step 10 is repeated for each of the patterns (A, B, C and D). At step 10, except for the work variable of the current line that is not shifted, the work variables that correspond to the positions of blanks are maintained unchanged, whereas bits of the work variables that correspond to the positions of black points are inverted. These 8 work variables so obtained are employed to acquire the total logical OR result for each bit. Then, an AND operation is performed for each bit of the logical OR result and the resultant work variable, and the results are substituted into the resultant work variable.

Finally, at step 11, the processing object portion of the resultant work variable is written into the processed result image. If the rightmost end is smaller than the processing object portion (as exemplified by the rightmost processing unit in FIG. 14), the remaining portion is masked out or it is not included in a width of the image.

A specific example that is written in C in accordance with the flowchart in FIG. 15 is exemplified below for a reference purpose. It is assumed here that a pattern of "m" bit wide and "n" lines high (m n) is used and "t" is equal to 32.

```
Large Corner Smoothing (Deletion of Large Corners)
#define CHAR_WIDTH 8
#define SHORT_WIDTH 16
#define LONG_WIDTH 32
/* for big endian system */
void smooth(
    char *pImag     /* pointer of Image (Input)  */
    long imgWidth   /* Image width               */
    long imgHeight  /* Image height              */
) {
    unsigned long ct;   /* center      work variable 1 */
    unsigned long cl;   /* c. left     work variable 2 */
    unsigned long cr;   /* c. right    work variable 3 */
    unsigned long up;   /* up          work variable 4 */
    unsigned long ul;   /* u. left     work variable 5 */
    unsigned long ur;   /* u. right    work variable 6 */
    unsigned long dw;   /* down        work variable 7 */
    unsigned long dl;   /* d. left     work variable 8 */
    unsigned long dr;   /* d. right    work variable 9 */
    unsigned long work; /* resultant   work variable   */
    long*    pIImg;     /* pointer of Image (Input) */
    short*   psImg;     /* pointer of Image (Input) */
    long   i, j; /* counter */
    long   cntX;
    char*  pImgTemp;    /* pointer of Image */
    char*  pImgWork;    /* pointer of Image (Work Area) */
    char*  pImgWorkOrg; /* pointer of Image (for save pointer) */
    /* Input image is assumed to be a 32 bit line.  */
    cntX = (imgWidth+31) / LONG_WIDTH*2;
    pImgWorkOrg =
    (char*)calloc((cntX*(SHORT_WIDTH/CHAR_WIDTH))
            * (imgHeight+2)+2, sizeof(char));
    /* Shift a pattern of m n (m bits   n lines) by 1line */
    /* and copy it into the work area (m bits   (m bits (n+2) lines). */
    memcpy (pImgWrkOrg+cntX*(SHORT_WIDTH/CHAR_WIDTH)+1,
    pImg,
        cntX*(SHORT_WIDTH/CHAR_WIDTH)* imgHeight);
    /* clear */
    memset (pImg, 0,
    cntX*(SHORT_WIDTH/CHAR_WIDTH)* imgHeight);
    pImgTemp = pImg;
    pImgWork =
    pImgWorkOrg+cntX*(SHORT_WIDTH/CHAR_WIDTH);
    for (i = 0; i < imgHeight25; i++) { /* loop (y-axis)       */
        for (j =0; j < cntX; j++) { /* loop (x-axis) by 2byte-unit */
            /* Shift (i)th line in sequence by the length of one  */
            /* processing object from the leftmost end up to the  */
            /* rightmost end for selecting a processing object.   */
            /* Add left and right areas of the processing object  */
            /* to form a basic processing unit (processing unit). */
            up =    * ((unsigned long *)(pImgWork
                   - cntX*(SHORT_WIDTH/CHAR_WIDTH)));
            ct =    *((unsigned long *)(pImgWork));
            dw =    *((unsigned long *)(pImgWork
                   + cntX*(SHORT_WIDTH/CHAR_WIDTH)));
```

```
                -continued

/* Correction of an end of the image */
            if (j=0) {
                up &= 0x00ffffff
                ct &= 0x00ffffff
                dw &= 0x00ffffff
            } else
            if (j=cntX-1) {
                up &= 0xffffff00
                ct &= 0xffffff00
                dw &= 0xffffff00
            }
            /* Shift the work variables to the left and right by one   */
            /* bit respecitvely and substitute them into different     */
            /* work variables. Create 9 work variables.                */
            cl = ct >> 1;
            cr = ct << 1;
            ul = up >> 1;
            ur = up << 1;
            dl = dw >> 1;
            dr = dw << 1;
            /* Substitute work variable for the current line not       */
            /* shifted into the resultant work variable.               */
            work = ct;
            /* Repeat the following for each of the 4 patterns.        */
            /* Except for the work variables of the current line       */
            /* not shifted, leave the owrk variables                   */
            /* corresponding to the positions of blank dots in         */
            /* the above diagram unchanged, invert bits of the         */
            /* work variables corresponding to black points. Use       */
            /* the 8 work variables to acquire an OR result for        */
            /* each bit. Then, perform an AND operation for each       */
            /* bit of this result and the resultant work variable      */
            /* , and substitute the AND results into the               */
            /* resultant work variable.                                */
            work &=(~ul | ~up |  ur | ~cl |  cr |  dl |  dw | dr );
            work &=(  ul | ~up | ~ur |  cl | ~cr |  dl |  dw | dr );
            work &=(  ul |  up |  ur | ~cl |  cr | ~dl | ~dw | dr );
            work &=(  ul |  up |  ur |  cl | ~cr |  dl |~dr | ~dr );
            psImg = (unsigned short *)(pImgTemp);
            *psImg = (unsigned short)(work>>8);
            pImgTemp += 2;
            pImgWork += 2;
        } /* End of for each j */
    } /* End of for each i */
    /* release pointer */
    free(pImgworkOrg);
}
```

FIG. 16 shows a flowchart of the smoothing process for deleting individual protruding/extraneous dots. The basic processing flow of this smoothing process is identical to that of the aforesaid smoothing process for corners. At step 1, a bit pattern is read into a work area. When the total number of lines in the bit pattern is defined to be "n" the work area contains "n+2" lines, since it has two extra lines at the top and at the bottom. Therefore, the bit pattern is read and stored into the work area from its second line. At step 2, the lines at the top and the bottom are blanked out. At step 3, a loop variable "i" is incremented by one from "2" to "n+1" for causing the subsequent step 4 through step 11 to be repeated.

At step 4, a bit string in the "i"th line is sequentially shifted by a processing object length from the leftmost end up to the rightmost end for selecting a processing object, and the subsequent step 5 through 11 are repeated up to the rightmost end. Upon reaching at the rightmost end, this process returns to the leftmost end of the next line and the same processing is performed again. In the example shown in FIG. 14, the processing object is set to be 48 bits long. At step 5, left and right areas of the processing object are added to form a basic processing unit (processing unit). In the example shown in FIG. 14, left 8 bits and right 8 bits are added to the processing object of 48 bit length to form the processing unit of 64 bits long.

At step 6, with respect to the "i"th line of the work area, its preceding line (i−1), the current line (i) and its next line (i+1) are substituted into the work variables. At step 7, the work variables are shifted to the right and to the left by one bit position respectively and are substituted into different work variables. Therefore, 9 work variables are created. At step 8, work variable for the current line that is not shifted is substituted into a resultant work variable. The subsequent steps 9 and 10 are slightly different from those in the smoothing process for corners.

At step 9, the subsequent step 10 is repeated for each of the patterns (E, F, G and H). At step 10, except for the work variable of the current line that is not shifted, 5 work variables that correspond to the positions of blanks are employed to acquire a total logical OR result for each bit. Then, a logical AND operation is performed for each bit of the Ored result and the resultant work variable, and the results are substituted into the resultant work variable.

Finally, at step 11, the processing object portion of the resultant work variable is written into the processed result image. If the rightmost end is smaller than the processing object portion (as exemplified by the rightmost processing unit in FIG. 14), the remaining portion is masked out or it is not included in a width of the image. Thus, the process for smoothing individual protruding/extraneous dots is now completed.

A specific example that is written in C in accordance with the flowchart in FIG. 16 is exemplified below for a reference purpose.

```
Deletion of Individual Protruding/Extraneous Dots
# define   CHAR_WIDTH 8
# define   SHORT_WIDTH 16
# define   LONG_WIDTH 32
/* for big endian system */
void delnoise(
   char *pImag    /* pointer of Image (Input)   */
   long imgWidth  /* Image width                */
   long imgHeight /* Image height               */
) {
   unsigned long ct;    /* center       work variable 1 */
   unsigned long cl;    /* c. left      work variable 2 */
   unsigned long cr;    /* c. right     work variable 3 */
   unsigned long up;    /* up           work variable 4 */
   unsigned long ul;    /* u. left      work variable 5 */
   unsigned long ur;    /* u. right     work variable 6 */
   unsigned long dw;    /* down         work variable 7 */
   unsigned long dl;    /* d. left      work variable 8 */
   unsigned long dr;    /* d. right     work variable 9 */
   unsigned long work;  /* resultant    work variable   */
   long*   pIImg;       /* pointer of Image (Input) */
   short*  psImg;       /* pointer of Image (Input) */
   long    i, j; /* counter */
   long    cntX;
   char*   pImgTemp;    /* pointer of Image */
   char*   pImgWork;    /* pointer of Image (Work Area) */
   char*   pImgWorkOrg; /* pointer of Image (for save pointer) */
   /* Input image is assumed to be a 32 bit line.   */
   cntX = (imgWidth+31) / LONG_WIDTH*2;
   pImgWorkOrg =
   (char*)calloc((cntX*(SHORT_WIDTH/CHAR_WIDTH))
        * (imgHeight+2)+2, sizeof(char));
   /* Shift a pattern of m n (m bits    n lines) by 1line */
   /* and copy it into the work area (m bits   (m bits (n+2) lines). */
   memcpy (pImgWrkOrg+cntX*(SHORT_WIDTH/CHAR_WIDTH)+1,
   pImg,
      cntX*(SHORT_WIDTH/CHAR_WIDTH)* imgHeight);
   /* clear */
   memset (pImg, 0,
   cntX*(SHORT_WIDTH/CHAR_WIDTH)* imgHeight);
   pImgTemp = pImg;
   pImgWork =
   pImgWorkOrg+cntX*(SHORT_WIDTH/CHAR_WIDTH);
   for (i = 0; i < imgHeight25; i++) { /* loop (y-axis)       */
      for (j =0; j < cntX; j++) { /* loop (x-axis) by 2byte-unit */
```

-continued

```
      /* Shift (i)th line in sequence by the length of one    */
      /* processing object from the leftmost end up to the    */
      /* rightmost end for selecting a processing object.     */
      /* Add left and right areas of the processing object    */
      /* to form a basic processing unit (processing unit).   */
      up =   * ((unsigned long *)(pImgWork
                 - cntX*(SHORT_WIDTH/CHAR_WIDTH)));
      ct =   *((unsigned long *)(pImgWork));
      dw =   *((unsigned long *)(pImgWork
                 + cntX*(SHORT_WIDTH/CHAR_WIDTH)));
      /* Correction of an end of the image */
      if (j=0) {
         up &= 0x00ffffff
         ct &= 0x00ffffff
         dw &= 0x00ffffff
      } else
      if (j=cntX-1) {
         up &= 0xffffff00
         ct &= 0xffffff00
         dw &= 0xffffff00
      }
      /* Shift the work variables to the left and right by    */
      /* one bit respectively and substitute them into        */
      /* different work variables. Create 9 work variables.   */
      cl = ct >> 1;
      cr = ct << 1;
      ul = up >> 1;
      ur = up << 1;
      dl = dw >> 1;
      dr = dw << 1;
      /* Substitute work variable for the current line        */
      /* not shifted into the resultant work variable.        */
      work = ct;
      /* Repeat the following for each of the 4 patterns.     */
      /* Except for the work variable of the current line     */
      /* not shifted, leave, the work variables               */
      /* corresponding to the positions of blank dots in      */
      /* the above diagram unchanged, invert bits of the      */
      /* work variables corresponding to black points. Use    */
      /* the 8 work variables to acquire an OR result for     */
      /* each bit. Then, perform an AND operation for each    */
      /* bit of this result and the resultant work variable   */
      /* , and substitute the AND results into the            */
      /* resultant work variable.                             */
      work &= ( cl | cr | ul | up | ur );
      work &= ( cl | cr | dl | dw | dr );
      work &= ( up | dw | ul | cl | dl );
      work &= ( up | dw | ur | cr | dr );
      psImg = (unsigned short *)(pImgTemp);
      *psImg = (unsigned short)(work>>8);
      pImgTemp += 2;
      pImgWork += 2;
   } /* End of for each j */
} /* End of for each i */
/* release pointer */
free(pImgworkOrg);
}
```

Figures 17, 18:
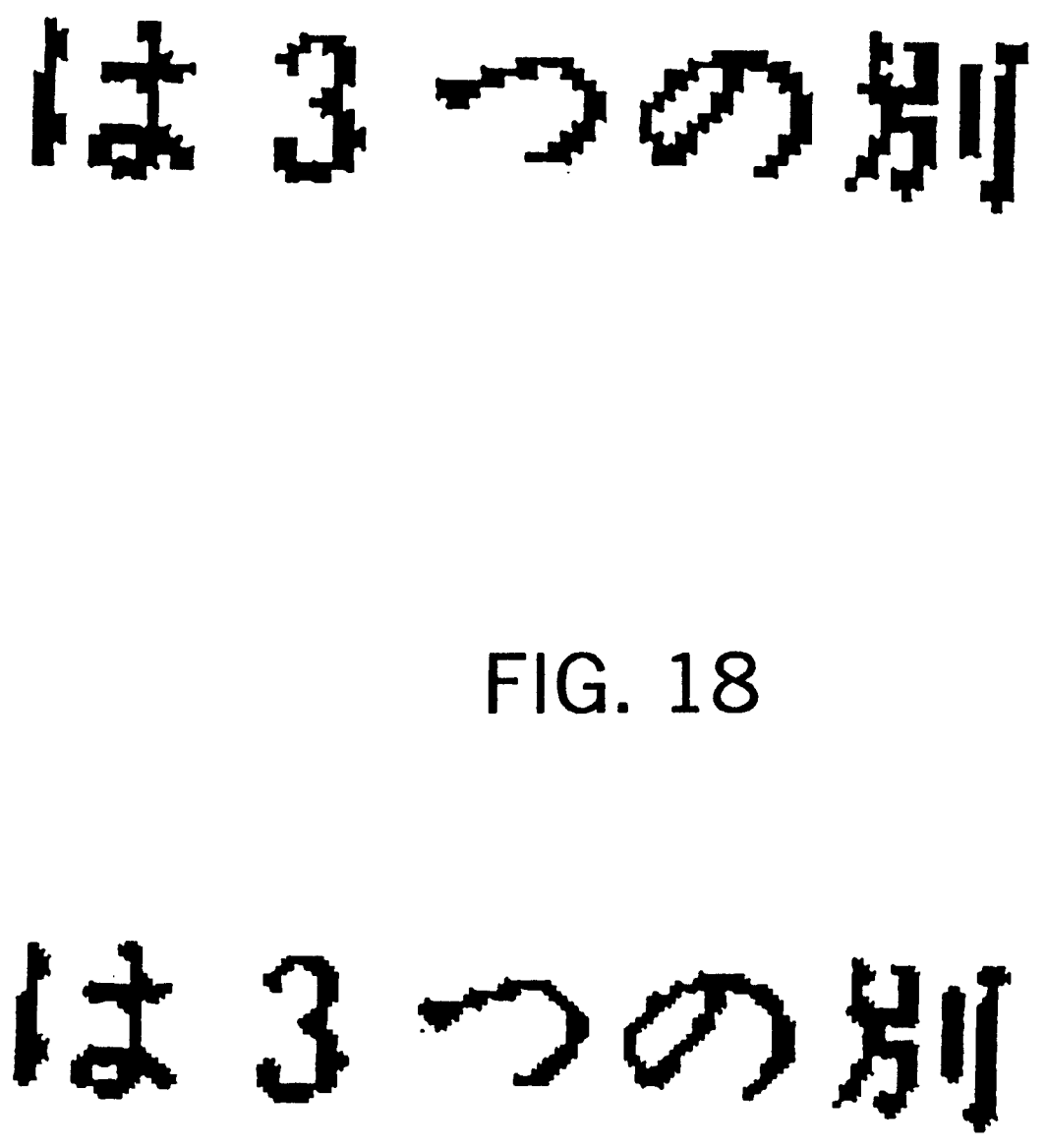

FIGS. 17 through 20 are diagrams showing the bit patterns before and after performing each of the aforesaid smoothing methods (1) and (2) respectively. With a negligible reduction of processing speed, large corners found in FIG. 17 have been substantially deleted as seen in FIG. 18, whereas scattered protruding/extraneous dots found in FIG. 19 have been dramatically deleted.

We claim:

1. A method of processing an image of a bit pattern, which is "m" bits wide and "n" lines high ("m" and "n" are natural numbers), by using a computer system having an operation storage area of an "r" bit width ("r" is a natural number), comprising the steps of:

(a) extracting from a current "i"th line ("i" is a natural number less than or equal to "n") of said bit pattern, a processing unit of "t" bits ("t" is a natural number less than or equal to "m" and "r") including a current processing object of "s" bits and at least one pair of "a" bits ("a" is a natural number), with at least one "a" bit of the pair immediately preceding and the other a bit of the pair succeeding said current processing object respectively, and storing said processing unit into said operation storage area;

(b) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(c) outputting "s" bits including a result of said logical operations as a processed result; and (d) repeating said steps (a) through (c) by using "s" bits that consecutively succeed said current processing object as a new current processing object.

2. The method of processing an image, as set forth in claim 1, wherein said step of performing logical operations includes the step of performing a logical AND operation between said current processing object and either one of:

(a) an operation result obtained by inverting only three line variables, including said upper processing object, as well as two line variables being formed by bit-shifting each of said current and upper processing objects to the left respectively, and by performing a logical OR operation among the said inverted three line variables and the remaining non-inverted line variables other than said current processing object;

(b) an operation result obtained by inverting only three line variables, including said lower processing object, as well as two line variables being formed by bit-shifting each of said current and lower processing objects to the left respectively, and by performing a logical OR operation among the said inverted three line variables and the remaining non-inverted line variables other than said current processing object;

(c) an operation result obtained by inverting only three line variables, including said upper processing object, as well as two line variables being formed by bit-shifting each of said current and upper processing objects to the right respectively, and by performing a logical OR operation among the said inverted three line variables and the remaining non-inverted line variables other than said current processing object; and (d) an operation result obtained by inverting only three line variables, including said lower processing object, as well as two line variables being formed by bit-shifting each of said current and lower processing objects to the right respectively, and by performing a logical OR operation among the said inverted three line variables and the remaining non-inverted line variables other than said current processing object.

3. The method of processing an image, as set forth in claim 1, wherein said step of performing logical operations includes the step of performing a logical AND operation between said current processing object and either one of:

(e) an operation result obtained by performing a logical OR operation among five line variables, including three line variables being formed by bit-shifting each of said current, upper and lower processing objects to the right respectively, as well as said upper and lower processing objects;

(f) an operation result obtained by performing a logical OR operation among five line variables, including four line variables being formed by bit-shifting each of said current and lower processing objects to the left and right respectively, as well as said lower processing object;

(g) an operation result obtained by performing a logical OR operation among five line variables, including three line variables being formed by bit-shifting each of said current, upper and lower processing objects to the left respectively, as well as said upper and lower processing objects; and (h) an operation result obtained by performing a logical OR operation among five line variables, including four line variables being formed by bit-shifting each of said current and upper processing objects to the left and right respectively, as well as said upper processing object.

4. A method of processing an image of a bit pattern, which is "m" bits wide and "n" lines high ("m" and "n" are natural numbers), by using a computer system having an operation storage area of an "r" bit width ("r" is a natural number), comprising the steps of:

(a) extracting from a current "i"th line ("i" is a natural number less than or equal to "n") of said bit pattern, a processing unit of "t" bits ("t" is a natural number less than or equal to "m" and "r") including a current processing object of "s" bits and at least one pair of "a" bits ("a" is a natural number), with one "a" bit in the pair immediately preceding and the other "a" bit in the pair succeeding said current processing object respectively, and storing said processing unit into said operation storage area;

(b) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(c) outputting "s" bits including a result of said logical operations as a processed result;

(d) repeating said steps (a) through (c) by using "s" bits that consecutively succeed said current processing object as a new current processing object; and (e) performing pattern recognition based on the outputted processed result.

5. An apparatus having an operation storage area of an "r" bit width ("r" is a natural number) for processing an image of a bit pattern, which is "m" bits wide and "n" lines high ("m" and "n" are natural numbers), comprising:

(a) a work area for storing an image of said bit pattern being shifted by one line;

(b) image processing means for:

(b1) extracting from a current "i"th line ("i" is a natural number less than or equal to "n") of said bit pattern, a processing unit of "t" bits ("t" is a natural number less than or equal to "m" and "r") including a current processing object of "s" bits and at least one pair of "a" bits ("a" is a natural number), with one "a" bit in the pair immediately preceding and the other "a" bit in the pair succeeding said current processing object respectively, and storing said processing unit into said operation storage area;

(b2) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(b3) outputting "s" bits including a result of said logical operations as a processed result; and (b4) repeating said steps (b1) through (b3) by using "s" bits that consecutively succeed said current processing object as a new current processing object; and (c) processed result image storage means for storing said processed result.

6. The apparatus for processing an image, as set forth in claim 5, wherein said logical operations includes a logical AND operation between said current processing object and either one of:

(a) an operation result obtained by inverting only three line variables, including said upper processing object, as well as two line variables being formed by bit-shifting each of said current and upper processing objects to the left respectively, and by performing a logical OR operation among the said inverted three line variables and the remaining non-inverted line variables other than said current processing object;

(b) an operation result obtained by inverting only three line variables, including said lower processing object, as well as two line variables being formed by bit-shifting each of said current and lower processing objects to the left respectively, and by performing a logical OR operation among the said inverted three line variables and the remaining non-inverted line variables other than said current processing object;

(c) an operation result obtained by inverting only three line variables, including said upper processing object, as well as two line variables being formed by bit-shifting each of said current and upper processing objects to the right respectively, and by performing a logical OR operation among the said inverted three line variables and the remaining non-inverted line variables other than said current processing object; and (d) an operation result obtained by inverting only three line variables, including said lower processing object, as well as two line variables being formed by bit-shifting each of said current and lower processing objects to the right respectively, and by performing a logical OR operation among the said inverted three line variables and the remaining non-inverted line variables other than said current processing object.

7. The apparatus for processing an image, as set forth in claim 5, wherein said logical operations includes a logical AND operation between said current processing object and either one of:

(e) an operation result obtained by performing a logical OR operation among five line variables, including three line variables being formed by bit-shifting each of said current, upper and lower processing objects to the right respectively, as well as said upper and lower processing objects;

(f) an operation result obtained by performing a logical OR operation among five line variables, including four line variables being formed by bit-shifting each of said current and lower processing objects to the left and right respectively, as well as said lower processing object;

(g) an operation result obtained by performing a logical OR operation among five line variables, including three line variables being formed by bit-shifting each of said current, upper and lower processing objects to the left respectively, as well as said upper and lower processing objects; and (h) an operation result obtained by performing a logical OR operation among five line variables, including four line variables being formed by bit-shifting each of said current and upper processing objects to the left and right respectively, as well as said upper processing object.

8. An apparatus having an operation storage area of an "r" bit width ("r" is a natural number) for processing an image of a bit pattern, which is "m" bits wide and "n" lines high ("m" and "n" are natural numbers), comprising:

(a) a work area for storing an image of said bit pattern being shifted by one line;

(b) image processing means for:

(b1) extracting from a current "i"th line ("i" is a natural number less than or equal to "n") of said bit pattern, a processing unit of "t" bits ("t" is a natural number less than or equal to "m" and "r") including a current processing object of "s" bits and at least one pair of "a" bits ("a" is a natural number), with one "a" bit in the pair immediately preceding and the other "a" bit in the pair succeeding said current processing object respectively, and storing said processing unit into said operation storage area;

(b2) performing logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(b3) outputting "s" bits including a result of said logical operations as a processed result; and (b4) repeating said steps (b1) through (b3) by using "s" bits that consecutively succeed said current processing object as a new current processing object;

(c) processed result image storage means for storing said processed result; and (d) image recognition means for performing pattern recognition based on the outputted processed result.

9. A storage medium for storing an image processing program executable on a computer system having an operation storage area of an "r" bit width ("r" is a natural number), said image processing program being adapted for processing an image of a bit pattern, which is "m" bits wide and "n" lines high ("m" and "n" are natural numbers), said image processing program comprising:

(a) program code for indicating said computer system to extract from a current "i"th line ("i" is a natural number less than or equal to "n") of said bit pattern, a processing unit of "t" bits ("t" is a natural number less than or equal to "m" and "r") including a current processing object of "s" bits and at least one pair of "a" bits ("a" is a natural number), with one "a" bit in the pair immediately preceding and the other "a" bit in the pair succeeding said current processing object respectively, and to store said processing unit into said operation storage area;

(b) program code for indicating said computer system to perform logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(c) program code for indicating said computer system to output "s" bits including a result of said logical operations as a processed result; and (d) program code for indicating said computer system to repeat said steps (a) through (c) by using "s" bits that consecutively succeed said current processing object as a new current processing object.

10. The storage medium, as set forth in claim 9, wherein said logical operations includes a logical AND operation between said current processing object and either one of:

(a) an operation result obtained by inverting only three line variables, including said upper processing object, as well as two line variables being formed by bit-shifting each of said current and upper processing objects to the left respectively, and by performing a logical OR operation among the said inverted three line variables and the remaining non-inverted line variables other than said current processing object;

(b) an operation result obtained by inverting only three line variables, including said lower processing object, as well as two line variables being formed by bit-shifting each of said current and lower processing objects to the left respectively, and by performing a logical OR operation among the said inverted three line variables and the remaining non-inverted line variables other than said current processing object;

(c) an operation result obtained by inverting only three line variables, including said upper processing object, as well as two line variables being formed by bit-shifting each of said current and upper processing objects to the right respectively, and by performing a logical OR operation among the said inverted three line variables and the remaining non-inverted line variables other than said current processing object; and (d) an operation result obtained by inverting only three line variables, including said lower processing object, as well as two line variables being formed by bit-shifting each of said current and lower processing objects to the right respectively, and by performing a logical OR operation among the said inverted three line variables and the remaining non-inverted line variables other than said current processing object.

11. The storage medium, as set forth in claim 9, wherein said logical operations includes a logical AND operation between said current processing object and either one of:

(e) an operation result obtained by performing a logical OR operation among five line variables, including three line variables being formed by bit-shifting each of said current, upper and lower processing objects to the right respectively, as well as said upper and lower processing objects;

(f) an operation result obtained by performing a logical OR operation among five line variables, including four line variables being formed by bit-shifting each of said current and lower processing objects to the left and right respectively, as well as said lower processing object;

(g) an operation result obtained by performing a logical OR operation among five line variables, including three line variables being formed by bit-shifting each of said current, upper and lower processing objects to the left respectively, as well as said upper and lower processing objects; and (h) an operation result obtained by performing a logical OR operation among five line variables, including four line variables being formed by bit-shifting each of said current and upper processing objects to the left and right respectively, as well as said upper processing object.

12. A storage medium for storing an image processing program executable on a computer system having an operation storage area of an "r" bit width ("r" is a natural number), said image processing program being adapted for processing an image of a bit pattern, which is "m" bits wide and "n" lines high ("m" and "n" are natural numbers), said image processing program comprising:

(a) program code for indicating said computer system to extract from a current "i"th line ("i" is a natural number less than or equal to "n") of said bit pattern, a processing unit of "t" bits ("t" is a natural number less than or equal to "m" and "r") including a current processing object of "s" bits and at least one pair of "a" bits ("a" is a natural number), with one "a" bit of the pair immediately preceding and the other "a" bit of the pair succeeding said current processing object respectively, and to store said processing unit into said operation storage area;

(b) program code for indicating said computer system to perform logical operations by using three line variables, including said current processing object, an upper processing object of "s" bits located on an upper "i−1"th line at the same columns as said current processing object, and a lower processing object of "s" bits located on a lower "i+1"th line at the same columns as said current processing object, as well as six line variables each being formed by bit-shifting each of said current, upper and lower processing objects to the left and right respectively;

(c) program code for indicating said computer system to output "s" bits including a result of said logical operations as a processed result;

(d) program code for indicating said computer system to repeat said steps (a) through (c) by using "s" bits that consecutively succeed said current processing object as a new current processing object; and (e) program code for indicating said computer system to perform pattern recognition based on the outputted processed result.

\* \* \* \* \*